US012171334B2

(12) United States Patent
Kim et al.

(10) Patent No.: US 12,171,334 B2
(45) Date of Patent: Dec. 24, 2024

(54) REFRIGERATOR

(71) Applicant: LG Electronics Inc., Seoul (KR)

(72) Inventors: Wanhee Kim, Seoul (KR); Hanbyeol Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 17/802,221

(22) PCT Filed: Feb. 25, 2021

(86) PCT No.: PCT/KR2021/002397
§ 371 (c)(1),
(2) Date: Aug. 25, 2022

(87) PCT Pub. No.: WO2021/172904
PCT Pub. Date: Sep. 2, 2021

(65) Prior Publication Data

US 2023/0081091 A1 Mar. 16, 2023

(30) Foreign Application Priority Data

Feb. 25, 2020 (KR) ........................ 10-2020-0023102
Mar. 6, 2020 (KR) ........................ 10-2020-0028227

(51) Int. Cl.
*A47B 77/08* (2006.01)
*E06B 3/70* (2006.01)
(Continued)

(52) U.S. Cl.
CPC ................ *A47B 77/08* (2013.01); *E06B 3/70* (2013.01); *F25D 11/02* (2013.01); *F25D 23/02* (2013.01); *F25D 23/10* (2013.01)

(58) Field of Classification Search
CPC . A47B 77/08; E06B 3/70; E06B 5/006; E06B 3/82; E06B 2003/7011; F25D 11/02; F25D 23/02; F25D 23/10; F25D 2400/18
See application file for complete search history.

(56) References Cited

U.S. PATENT DOCUMENTS 9,339,993 B2 * 5/2016 Cites ......................... B32B 3/04
10,995,978 B2 * 5/2021 Lee ........................... F25C 5/22
(Continued)

FOREIGN PATENT DOCUMENTS

CN 207299701 5/2018
CN 109442859 3/2019
(Continued)

*Primary Examiner* — Hanh V Tran
(74) *Attorney, Agent, or Firm* — Fish & Richardson P.C.

(57) ABSTRACT

Technology capable of replacing an external panel of a refrigerator is disclosed. A refrigerator door comprises a frame assembly disposed side by side on both sides to form an edge of the refrigerator door and having a hollow portion formed in a longitudinal direction, a front panel coupled to one side of the frame assembly to form a front surface of the refrigerator door, a rear panel coupled to the other side of the frame assembly to form a rear surface of the refrigerator door, and a reinforcing panel disposed between the front panel and the rear panel. The frame assembly or the reinforcing panel has coupling grooves formed to be concave rearward on one side facing the front panel, and the coupling grooves are formed on both sides and spaced apart in a vertical direction, and coupling protrusions, at least a portion of which is accommodated in and fixed to the coupling grooves, are formed on a rear surface of the front panel.

20 Claims, 17 Drawing Sheets

(51) Int. Cl.

| | |
|---|---|
| ***F25D 11/02*** | (2006.01) |
| ***F25D 23/02*** | (2006.01) |
| ***F25D 23/10*** | (2006.01) |

(56) References Cited

U.S. PATENT DOCUMENTS

| | | | | |
|---|---|---|---|---|
| 11,320,192 | B2 * | 5/2022 | Lee | E06B 3/4627 |
| 11,402,147 | B2 * | 8/2022 | Lee | F25D 23/02 |
| 11,480,384 | B2 * | 10/2022 | Lee | F25D 23/126 |
| 2007/0188059 | A1 * | 8/2007 | Davis | F24C 15/045<br>312/265.6 |
| 2010/0095601 | A1 * | 4/2010 | Ha | F25D 23/02<br>312/405.1 |
| 2012/0169196 | A1 * | 7/2012 | Marchetti | E06B 5/006<br>312/265.6 |
| 2017/0318965 | A1 * | 11/2017 | Hawkins | A47B 96/20 |
| 2018/0080276 | A1 * | 3/2018 | Tymus | E06B 3/70 |
| 2019/0053685 | A1 * | 2/2019 | Chwalibog | A47L 15/4293 |

FOREIGN PATENT DOCUMENTS

| | | |
|---|---|---|
| JP | 59013990 | 1/1984 |
| JP | H0566083 | 3/1993 |
| JP | 6460832 | 1/2019 |
| KR | 20020082269 | 10/2002 |
| WO | WO2014024429 | 2/2014 |

* cited by examiner

REFRIGERATOR

CROSS-REFERENCE TO RELATED APPLICATIONS

This application is a National Stage application under 35 U.S.C. § 371 of International Application No. PCT/KR2021/002397, filed on Feb. 25, 2021, which claims the benefit of Korean Patent Application No. 10-2020-0023102, filed on Feb. 25, 2020 and Korean Patent Application No. 10-2020-0028227, filed on Jun. 3, 2020. The disclosures of the prior applications are incorporated by reference in their entirety.

TECHNICAL FIELD

The present disclosure relates to technology capable of replacing an external panel of a refrigerator.

BACKGROUND ART

In general, refrigerators are home appliances for storing foods at a low temperature in an internal storage space that is shielded by a door. To this end, the refrigerator is configured such that foods are stored in an optimal state, by cooling the inside of the storage space using cold air generated through heat exchange with refrigerant circulating in a refrigeration cycle.

Recently, refrigerators tend to be gradually enlarged and multifunctionalized according to changes in diet and enhancement of products, and refrigerators including various structures and convenience devices for user convenience and efficient use of an internal space have been released.

The storage space of the refrigerator may be opened and dosed by a door. In addition, the door of the refrigerator constitutes a front surface of the refrigerator. The user opens the door of the refrigerator to take out food stored in the refrigerator, and doses the door to cool and store the food in the refrigerator.

As described above, the door of the refrigerator is a component mainly operated by a user, needs to be easily opened or closed, and needs to be rigidly configured so that damage or failure does not occur in this process.

The door of the refrigerator includes a frame forming a framework and a panel member provided in front of the frame. The panel member may form appearance of a front surface of the door.

On the other hand, the design of the refrigerator door, that is, the shape, material, or color may be an important criterion for a consumer to purchase a refrigerator. Since the shape, material, or color of a door desired by each consumer is different, a uniformly manufactured door design may lower the purchase intention of the user.

Also, even if the user wants to change the design of the door while using the refrigerator, the design change is limited and the user has to purchase a refrigerator of a different model.

In response to such a consumer's request, the refrigerator door is provided so that the panel member is detachable, and the manufacturer may provide a customized panel member suitable for the consumer's preference.

That is, the viewpoint of refrigerator users is being changed to a type of interior in addition to food and beverage storage of the refrigerator. In addition, it is possible to express interior characteristics of individuals through the color and material of the refrigerator. Accordingly, the color and material of the refrigerator door also need to be easily changed according to user's interior preference.

The following prior art is disclosed in relation to a door of a refrigerator having a detachable panel member.

Prior Document 1

Japanese Patent Publication No. 6460832 (Registration Date: Jan. 11, 2019)

The freezing compartment door disclosed in Prior Document 1 is provided with a glass panel in front of a support, and is configured to additionally provide an attachment part to detachably attach the glass panel to the support.

In addition, the attachment part may include an adhesive plate, and a front surface of the adhesive plate may be configured to be adhered to an edge of the glass panel by an adhesive.

Prior document 1 may have the following problems.

Since the glass panel and the adhesive plate are adhered through the adhesive, once the glass panel is assembled, the glass panel may not be easily detached by the adhesive.

In addition, when the support and the attachment part are provided only at the lower part of the door and are fastened to each other through screws, there may be a problem in that supporting force for the glass panel is weakened.

In addition, when a plurality of depressions is formed in the front surface of the support and a plurality of attachment parts is provided in a vertical direction to be inserted into the depressions of the support, since the depressions of the support and attachment parts are aligned and the glass panel is moved rearward and is assembled, the assembly process is complicated and difficult.

In addition, an object of Prior Document 1 is to more easily separate the glass panel from other parts for recycling when the refrigerator is discarded. Therefore, when using the refrigerator, it is difficult to replace an external panel.

Prior Document 2

Chinese Utility Model Publication No. 207299701 U (Publishment Date: May 1, 2018)

A refrigerator having a detachable panel disclosed in Prior Document 2 discloses technology for attaching and detaching the panel using a magnetic strip.

Prior Document 3

Japanese Utility Model Publication S59-13990U (publishment date: Jan. 27, 1984)

A door device disclosed in Prior Document 3 discloses technology for attaching and detaching a panel using a magnet.

Prior Documents 2 and 3 may have the following problems.

When the panel is attached and detached using the magnet member, the panel attachment/detachment process may be easily performed, but there may be a problem regarding panel detachment due to weakening of the magnetic force. In particular, the panel may be detached by the impact caused by repeated opening and closing of the door.

In addition, since the panel may be attached by magnetic force even if the panel is not placed at a correct position, there is a possibility that the panel is assembled at a wrong position according to the users mistake.

INVENTION

Technical Problem

The present embodiment provides a refrigerator capable of easily replacing a front panel forming a front surface of a refrigerator door.

The present embodiment provides a refrigerator capable of replacing a front panel without space limitation.

The present embodiment provides a refrigerator capable of selecting, manufacturing and attaching a front panel forming a front surface of a refrigerator door according to preference.

The present embodiment provides a refrigerator capable of easily replacing the material and color of a front panel forming a front surface of a refrigerator door.

The present embodiment provides a refrigerator capable of preventing deformation of a refrigerator door.

The present embodiment provides a refrigerator capable of switching a front panel from a locked state to an unlocked state by simply rotating a lever at an upper end of a refrigerator door.

The present embodiment provides a refrigerator capable of switching a front panel from an unlocked state to a locked state by simply rotating a lever at an upper end of a refrigerator door.

Technical Solution

In order to solve the above-described problems, a refrigerator door according to an embodiment of the present disclosure may comprise a frame assembly disposed side by side on both sides to form an edge of the refrigerator door and having a hollow portion formed in a longitudinal direction, a front panel coupled to one side of the frame assembly to form a front surface of the refrigerator door, a rear panel coupled to the other side of the frame assembly to form a rear surface of the refrigerator door, and a reinforcing panel disposed between the front panel and the rear panel.

The frame assembly or the reinforcing panel may have coupling grooves formed to be concave rearward on one side facing the front panel, and the coupling grooves may be formed on both sides and spaced apart in a vertical direction.

Coupling protrusions, at least a portion of which is accommodated in and fixed to the coupling grooves, may be formed on a rear surface of the front panel.

The coupling protrusion may comprise a first extension extending rearward from a rear surface of the front panel and a second extension extending from the first extension in a direction of the rotation shafts.

The first extension and the second extension may form an obtuse angle.

The second extension may be formed such that a thickness of the other end is greater than that of one end connected to the first extension.

The second extension may form a protrusion protruding toward the fixing member to be locked by the fixing member.

Meanwhile, the coupling protrusion may comprise a first extension extending rearward from a rear surface of the front panel and a second extension extending inward from the first extension in a horizontal direction.

The first extension and the second extension may form a right angle.

A coupling groove formed in a horizontal direction to be concave from the inside to the outside may be formed in the coupling protrusion.

A coupling groove defined by a rear surface of the front panel and the first and second extensions may be further included.

The coupling groove may form an open entrance through which the fixing member is drawn in or drawn out, in a surface facing the rotation shaft.

The fixing member may comprise a shaft connector coupled to the rotation shaft to rotate together with the rotation shaft and a slider sliding in a horizontal direction to be selectively drawn in or drawn out of the coupling groove by rotation of the shaft connector.

The fixing members may further comprise an elastic member configured to connect the shaft connector and the slider and to move the slider in a straight line when the shaft connector rotates.

A lever for manipulating the rotation shaft may be coupled to an upper end of the rotation shaft of the refrigerator.

When the lever rotates rearward, the front panel may be switched to a locked state, and, when the lever rotates forward, the front panel may be switched to an unlocked state.

The lever may be fastened to an upper end of an upper cap deco through a separate fastening member in a state of being rotated forward or rearward.

An upper cap deco forming an upper surface of the refrigerator door may be further included, the rotation shafts may pass through the upper cap deco, and the upper ends of the rotation shafts and the lever may be exposed to the outside of the upper cap deco.

A lever groove concave downward may be formed in the upper cap deco, and the lever may be accommodated in the lever groove.

An opening open in a front-and-rear direction may be formed in the reinforcing panel, a groove member concave rearward may be coupled to a rear surface of the reinforcing panel, and the coupling groove may be defined by an inner space of the groove member and the opening.

At least a portion of an inner surface of the coupling groove may be formed as a curved surface or an inclined surface.

The coupling protrusion may be formed on a coupling member fixed to a rear surface of the front panel.

Irregularities may be formed in the reinforcing panel in a horizontal direction and at least a portion of a front surface facing the front panel may be formed as a flat surface.

A heat insulating layer made of a heat insulating material is formed between the reinforcing panel and the rear panel.

Effect of the Invention

According to the present disclosure, it is possible to freely set appearance of a door.

According to the present disclosure, it is possible to easily replace a front panel forming a front surface of a refrigerator door.

According to the present disclosure, it is possible to replace a front panel without space limitation.

According to the present disclosure, it is possible to easily replace the material of a front panel forming a front surface of a refrigerator door.

According to the present disclosure, it is possible to select, manufacture and attach a front panel forming a front surface of a refrigerator door according to preference.

According to the present disclosure, it is possible to easily replace the material and color of a front panel forming a bottom of a refrigerator door.

According to the present disclosure, it is possible to switch a front panel from a locked state to an unlocked state by simply rotating a lever at an upper end of a refrigerator door.

According to the present disclosure, it is possible to switch a front panel from an unlocked state to a locked state by simply rotating a lever at an upper end of a refrigerator door.

BEST MODE

Figure 1:
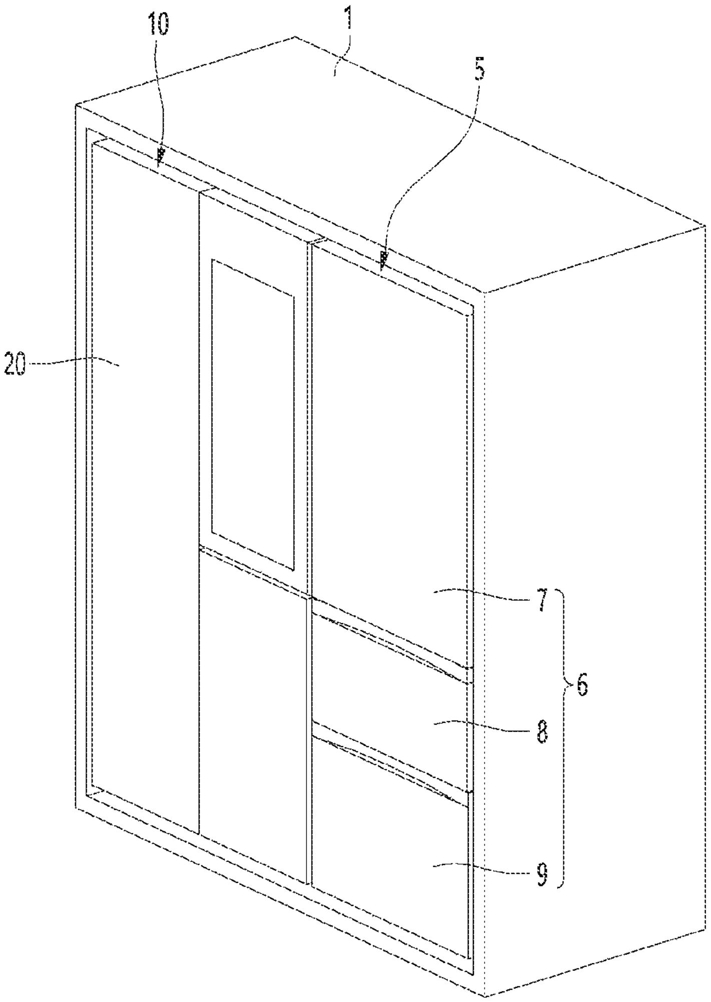
FIG. 1 is a view showing a state in which a refrigerator according to an embodiment of the present disclosure is installed in a furniture cabinet.

Hereinafter, some embodiments of the present disclosure will be described in detail with reference to exemplary drawings. In adding reference numerals to the components of each drawing, it should be noted that the same components are given the same reference numerals as much as possible even though they are shown on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), etc. may be used. These terms are only for distinguishing the components from other components, and the essence, order, or sequence of the components are not limited by the terms. When it is described that a component is "connected", "coupled" or "linked" to another component, it should be noted that the component may be directly connected or linked to the other component, but another component may also be "connected", "coupled" or "linked" between the components.

Figure 2:
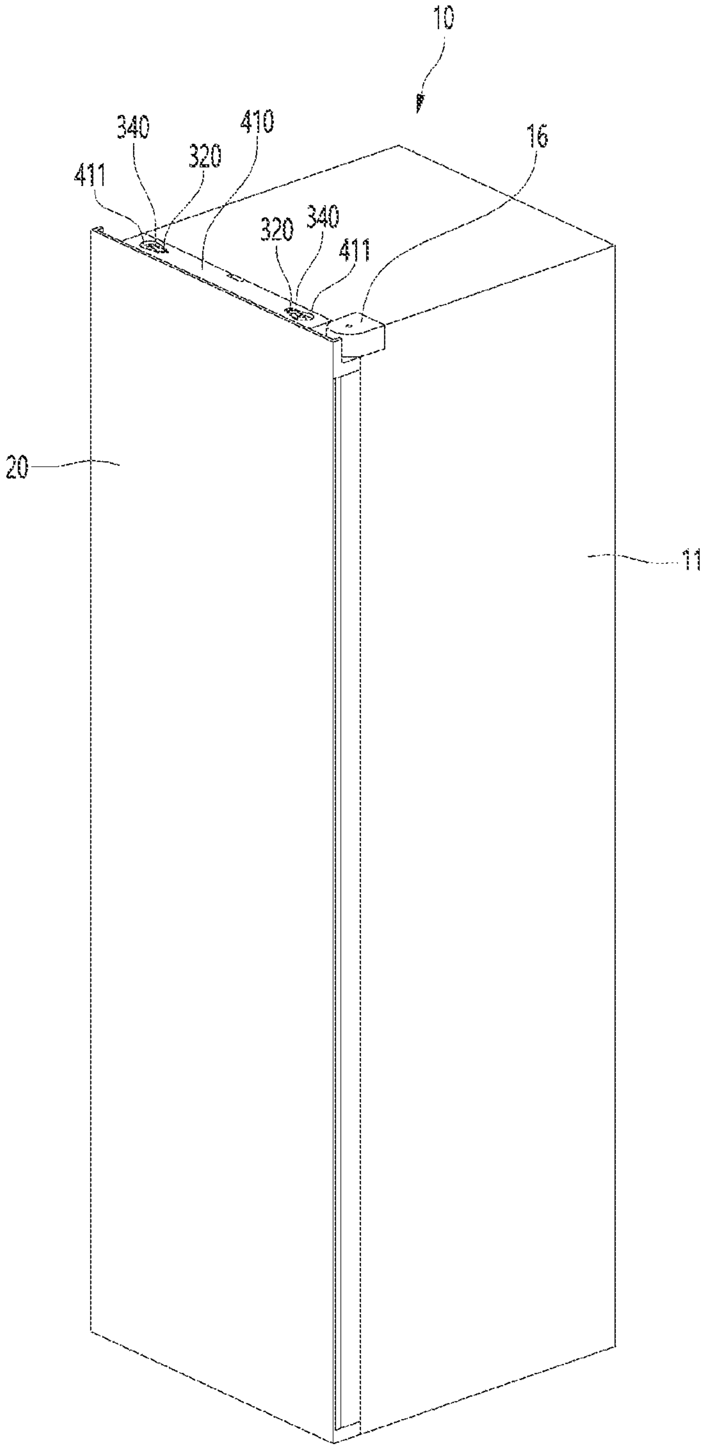
FIG. 2 is a perspective view of a refrigerator according to an embodiment of the present disclosure.

FIG. 1 is a view showing a state in which a refrigerator according to an embodiment of the present disclosure is installed in a furniture cabinet. FIG. 2 is a perspective view of a refrigerator according to an embodiment of the present disclosure.

Referring to FIGS. 1 to 2, the refrigerator 10 according to the present embodiment may be disposed independently or together with another refrigerator 5 in a kitchen or living room.

In addition, the refrigerator 5 may be disposed alone, in a kitchen or living room, or may be disposed in a kitchen or living room as a single module together with other furniture or home appliances.

In this case, a furniture cabinet 1 in which the refrigerators 5 and 10 may be accommodated may be provided in the kitchen or living room. The height of the accommodation space inside the furniture cabinet 1 may be set such that a gap between the upper surfaces of the refrigerators 5 and 10 and the upper wall of the furniture cabinet 1 is not large when the refrigerators 5 and 10 are accommodated.

If the gap between the upper surfaces of the refrigerators 5 and 10 and the upper wall of the furniture cabinet 1 is not large, the upper structures of the refrigerators 5 and 10 cannot be seen from the outside, and the sense of unity between the furniture cabinet 1 and the refrigerators 5 and 10 may be increased.

In addition, the gap between the side surfaces of the refrigerators 5 and 10 and the inner wall of the furniture cabinet 1 may also be set not to be large. As described above, if the gap between the side surfaces of the refrigerators 5 and 10 and the inner wall of the furniture cabinet 1 is not large, the sense of unity between the furniture cabinet 1 and the refrigerators 5 and 10 is increased at the outside.

The refrigerator 10 may include a cabinet 11 having a storage compartment and a refrigerator door 20 for opening and closing the storage compartment.

The refrigerator door 20 may be connected to the cabinet 11 through a hinge 16, and may open and close the storage compartment while rotating.

Also, the refrigerator door 6 of another refrigerator accommodated in the furniture cabinet 1 may include a plurality of doors 7, 8, and 9 spaced apart from each other in a vertical direction. Some or all of the plurality of doors 7, 8, and 9 may open and close the storage compartment in a sliding or rotating manner.

For reference, a refrigerating compartment may be provided inside the cabinet 11. Also, a freezing compartment may be provided inside the cabinet 11. In addition, a refrigerating compartment and a freezing compartment may be provided together inside the cabinet 11.

First Embodiment

Hereinafter, a refrigerator door according to an embodiment of the present disclosure will be described.

Figure 3:
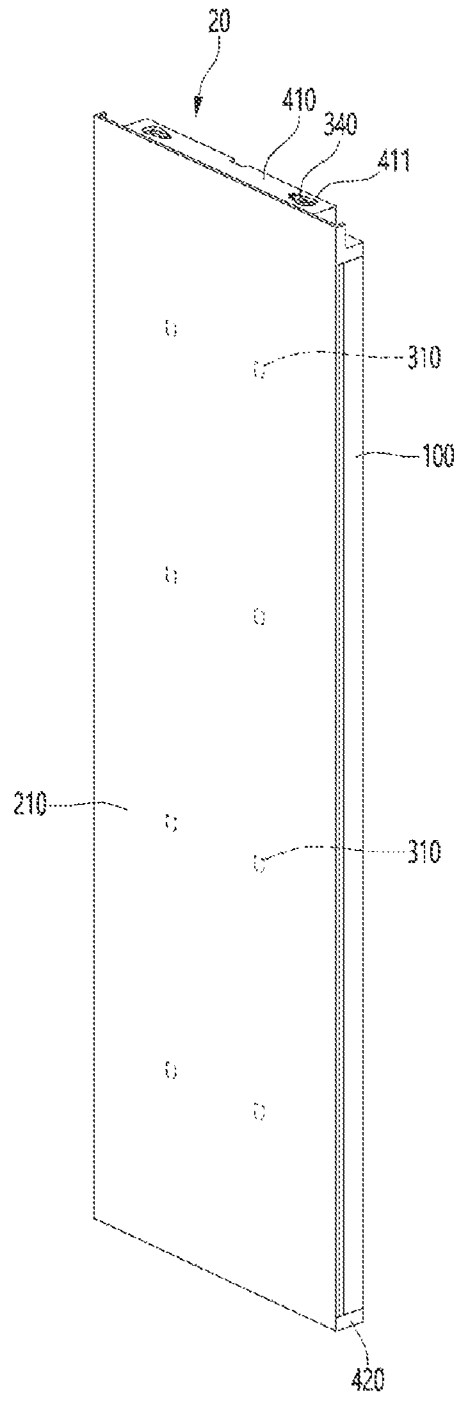
FIG. 3 is a perspective view of a refrigerator door according to an embodiment of the present disclosure.
Figure 4:
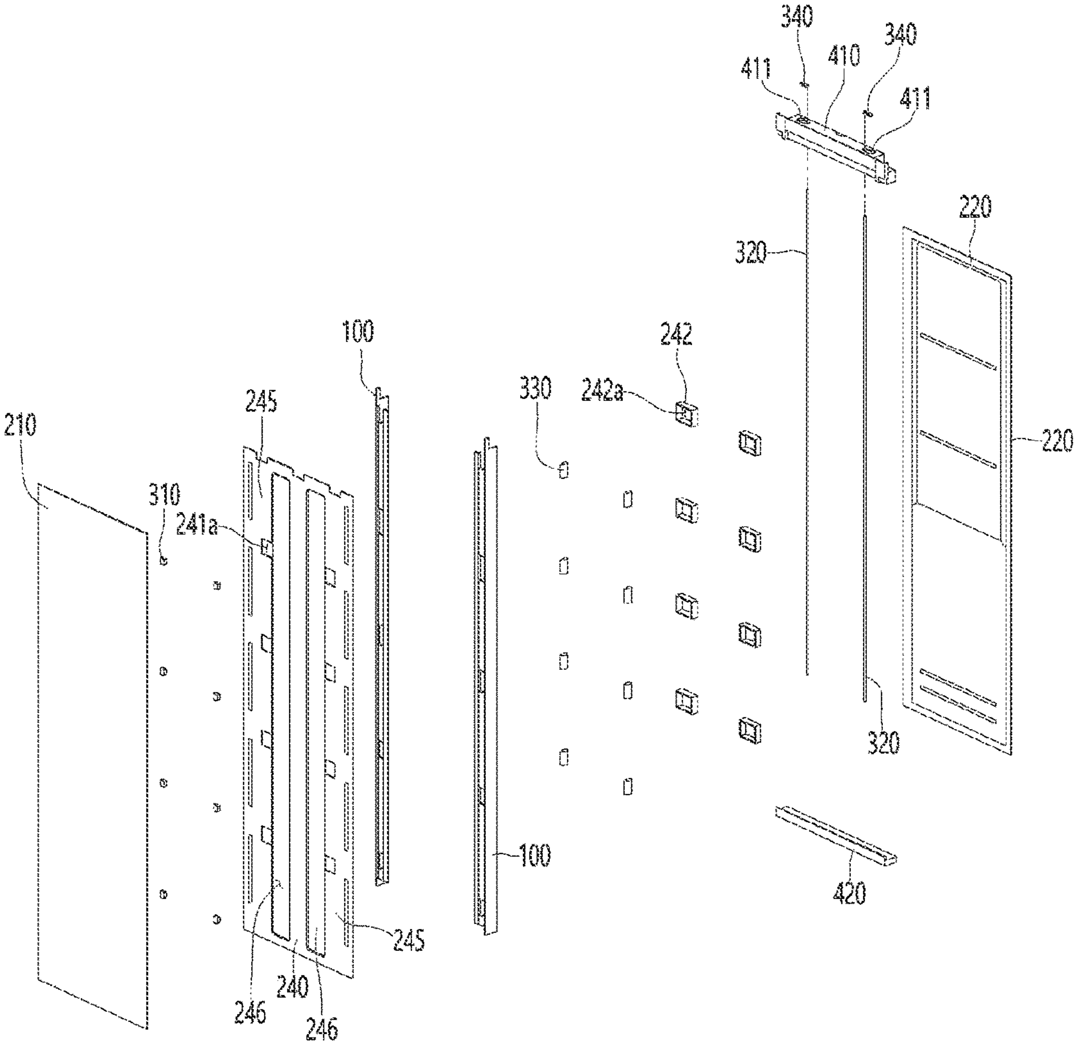
FIG. 4 is an exploded perspective view of a refrigerator door according to an embodiment of the present disclosure.

FIG. 3 is a perspective view of a refrigerator door according to an embodiment of the present disclosure. FIG. 4 is an exploded perspective view of a refrigerator door according to an embodiment of the present disclosure.

Referring to FIGS. 3 to 4, the refrigerator door 20 may include a frame assembly 100 forming appearance and a panel assembly 200 detachably coupled to the frame assembly 100.

The panel assembly 200 may form part or all of the appearance of a front surface of the refrigerator door 20. The appearance of the front surface of the refrigerator door 20 may substantially form the appearance of the front surface of the refrigerator 10.

Accordingly, a user may see the front surface of the panel assembly 200 in front of the refrigerator 10. The front surface of the panel assembly 200 may serve as a decorative panel at a place where the refrigerator 10 is installed. In this embodiment, the panel assembly 200 may be replaced according to user's preference. That is, according to the present disclosure, the user may easily separate the front surface of the panel assembly 200 and replace it with a design suitable for their preference.

Hereinafter, the refrigerator door 20 capable of not only easily replacing the panel assembly 200 in the refrigerator disposed alone but also replacing the panel assembly 200 without space limitation when the refrigerator 10 is accommodated in the furniture cabinet 1 will be described.

Referring to FIG. 4, the refrigerator door 20 according to an embodiment of the present disclosure includes a panel assembly 200 including a front panel 210 forming a front surface of the refrigerator door 20 and a rear panel 220 forming a rear surface of the refrigerator door 20 and a reinforcing panel 240 disposed between the front panel 210 and the rear panel 220.

In addition, the frame assembly 100 disposed side by side on both sides of the refrigerator door 20, including at least one frame, may be included.

According to the present disclosure, a coupling protrusion 310 may be formed on the rear surface of the front panel 210. Here, the coupling protrusion 310 may be formed to be fitted into a coupling groove 241 of the reinforcing panel 240.

Also, an upper cap deco 410 and a lower cap deco 420 that form the upper and lower surfaces of the refrigerator door 20 and are coupled to the frame assembly 100 and the panel assembly 200 may be included.

According to an embodiment of the present disclosure, the front panel 210 may be detachably coupled to the reinforcing panel 240 or the frame assembly 100.

To this end, the frame assembly 100 or the reinforcing panel 240 has coupling grooves 241 formed to be concave rearward on one side facing the front panel 210, but the coupling grooves 241 are formed on both sides, and may be disposed to be spaced apart in the vertical direction.

In addition, on the rear surface of the front panel 210, the coupling protrusion 310, at least a portion of which is fixed while being accommodated in the coupling groove 241, may be formed.

For example, the coupling protrusion 310 may be integrally formed with the front panel 210.

As another example, the coupling protrusion 310 may be formed as a member separate from the front panel 210, and may be fixed to the rear surface of the front panel 210.

In this case, the coupling protrusion 310 may be fixed to the rear surface of the front panel 210 in various ways.

For example, it may be fixed to the rear surface of the front panel by a hot-melt method or an adhesive method.

The front panel 210 may be formed of a metal material including a steel material, a glass material, or a plastic material. In addition, the front panel 210 may be formed of a wood material.

In the following description, the case in which the coupling protrusion 310 is attached to the rear surface of the front panel 210 and the coupling groove 241 is formed in the reinforcing panel 240 is described as an example, but the scope of the present disclosure is limited thereto and the coupling protrusion 310 may be integrally formed on the rear surface of the front panel 210 or the coupling groove may be formed in the frame assembly 100.

In addition, the coupling grooves 241 may be disposed on both sides of the reinforcing panel 240. In addition, a plurality of the coupling grooves 241 may be formed, and may be disposed in a line to be spaced apart in the vertical direction.

In this case, coupling protrusions 310 may be formed on the rear surface of the front panel 210 to correspond to the coupling grooves 241. The coupling protrusions 310 may be formed on both sides of the rear surface of the front panel 210. In addition, a plurality of the coupling protrusions 310 may be formed and disposed in a line spaced apart in the vertical direction.

In addition, rotation shafts 320 to be described later may also be disposed on both sides to correspond to the coupling grooves 241, and fixing members 330 may be disposed in the coupling grooves 241.

The fixing member 330 includes a fixing part 332 (refer to FIG. 8) fixed to the outer circumferential surface of the rotating shaft 320, and a pressing part 331 (see FIG. 8) extending in a radial direction from the fixing part 332 (refer to FIG. 8) and having at least a flat portion.

In addition, levers 340 may also be disposed on both upper ends of the upper cap deco 410.

For example, the coupling grooves 241 may be symmetrically disposed on both sides with respect to the vertical center line of the reinforcing panel 240.

In addition, the rotation shafts 320 the fixing members 330 and the levers 340 may also be symmetrically disposed on both sides with respect to the vertical center line of the reinforcing panel 240.

In addition, the coupling protrusions 310 may also be symmetrically disposed on both sides with respect to the vertical center line of the front panel 210.

According to an embodiment of the present disclosure, various fixing parts for fixing the coupling protrusions 310 so as to maintain a state in which the coupling protrusions 310 are accommodated in the coupling grooves 241 may be further included.

Figure 5:
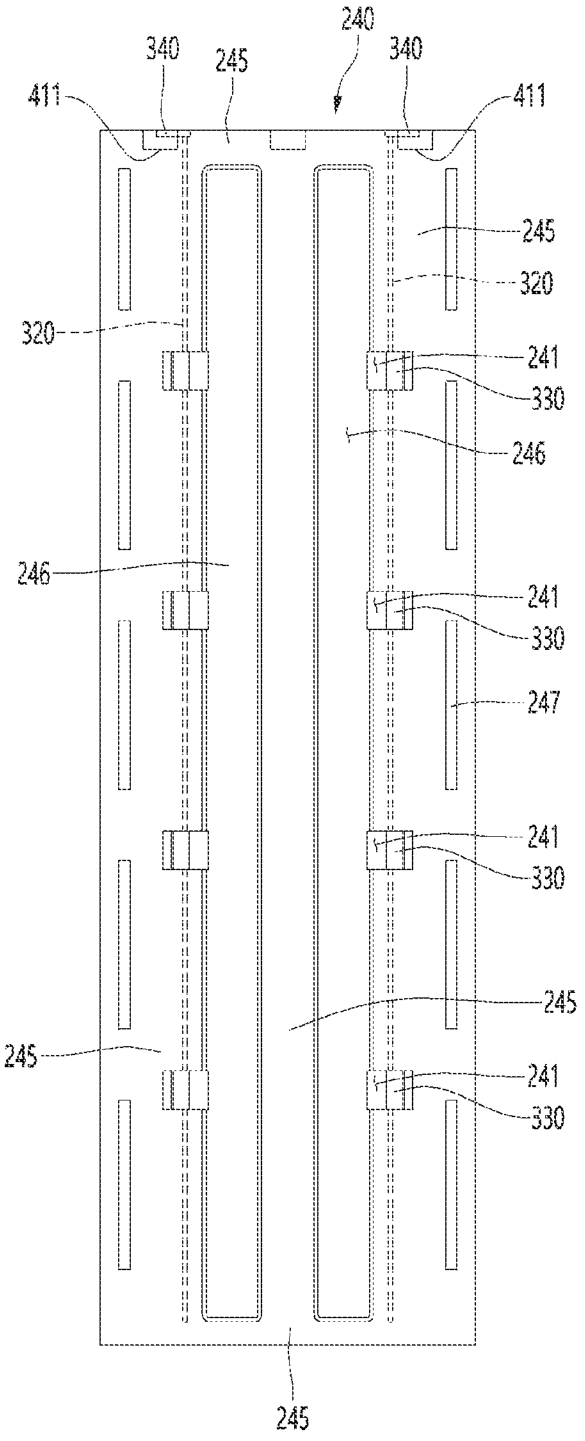
FIG. 5 is a front view of the refrigerator door, from which the front panel is separated, according to an embodiment of the present disclosure.
Figure 6:
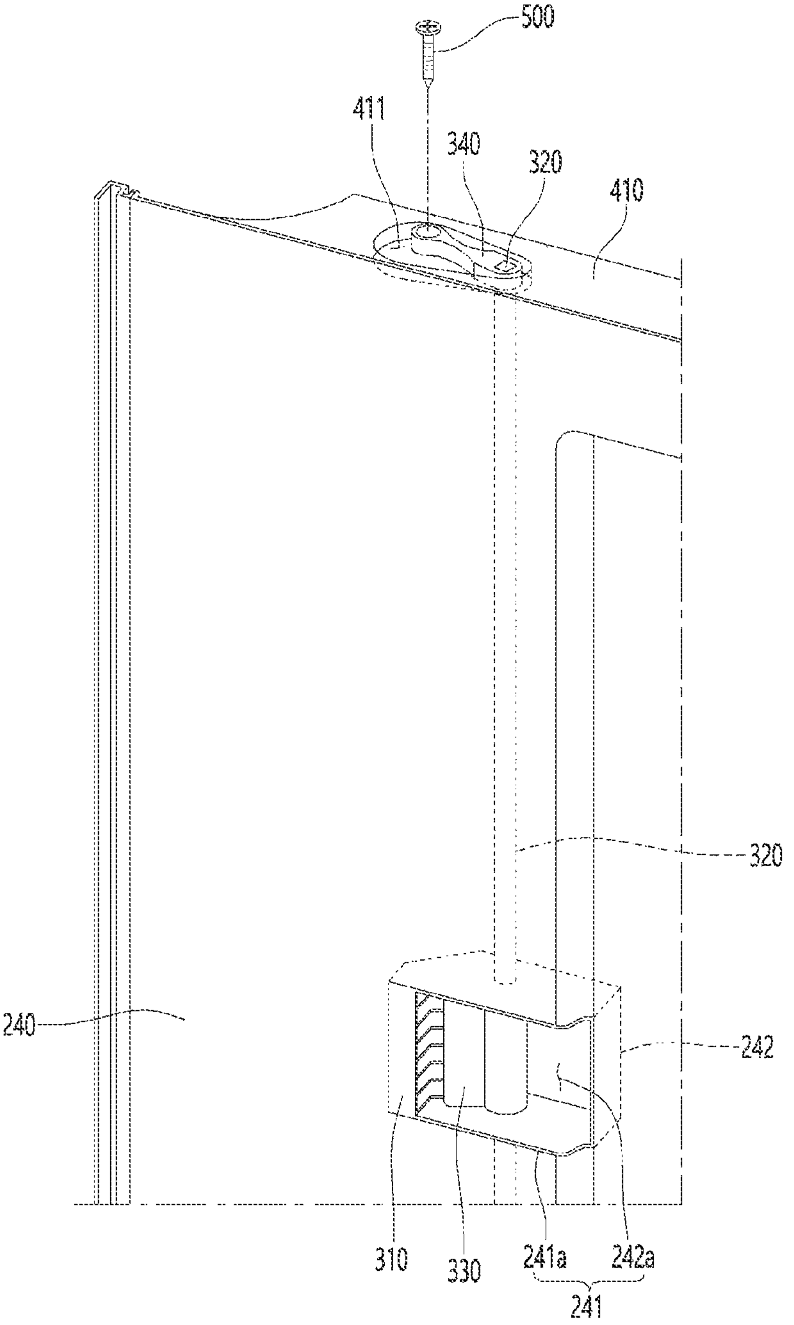
FIG. 6 is a perspective view of the refrigerator door, from which the front panel is separated, according to an embodiment of the present disclosure when viewed from above.

FIG. 5 is a front view of the refrigerator door, from which the front panel is separated, according to an embodiment of the present disclosure. FIG. 6 is a perspective view of the refrigerator door, from which the front panel is separated, according to an embodiment of the present disclosure when viewed from above.

Referring to FIGS. 5 to 6, between the reinforcing panel 240 and the rear panel 220, rotation shafts 320 extending in the vertical direction may be disposed on both sides to penetrate the coupling grooves 241.

In addition, the rotation shaft 320 is connected with fixing members 330 accommodated inside the coupling grooves 241 to fix or release the coupling protrusions 310 while rotating forward or backward according to the rotational direction with the rotation shaft 320.

Here, the expression 'fixing' means an operation of fixing the coupling protrusions 310 to maintain a state in which the coupling protrusions 310 are inserted into the coupling grooves 241. In addition, the expression 'releasing' means an operation of releasing the fixing so that the coupling protrusions 310 may be separated from the coupling grooves 241.

Figure 7:
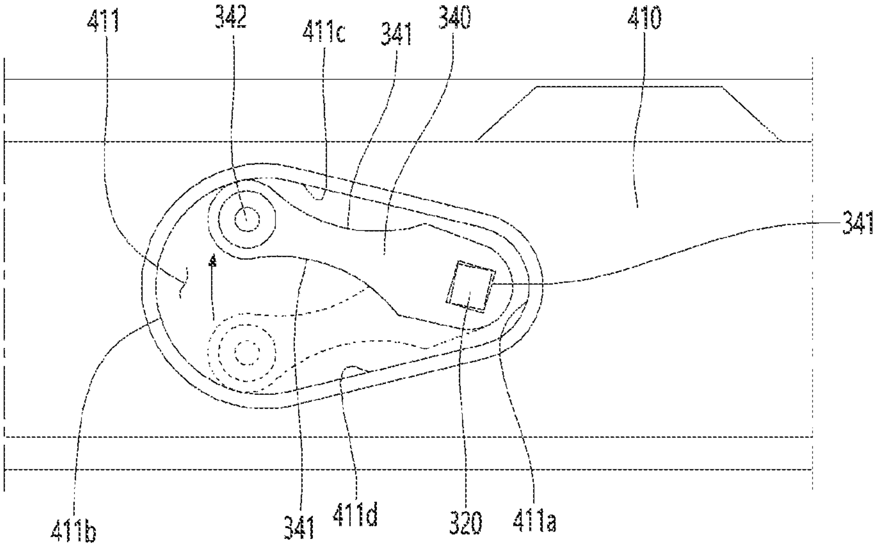
FIG. 7 is a view of a refrigerator door viewed from above in a locked state according to an embodiment of the present disclosure.
Figure 8:
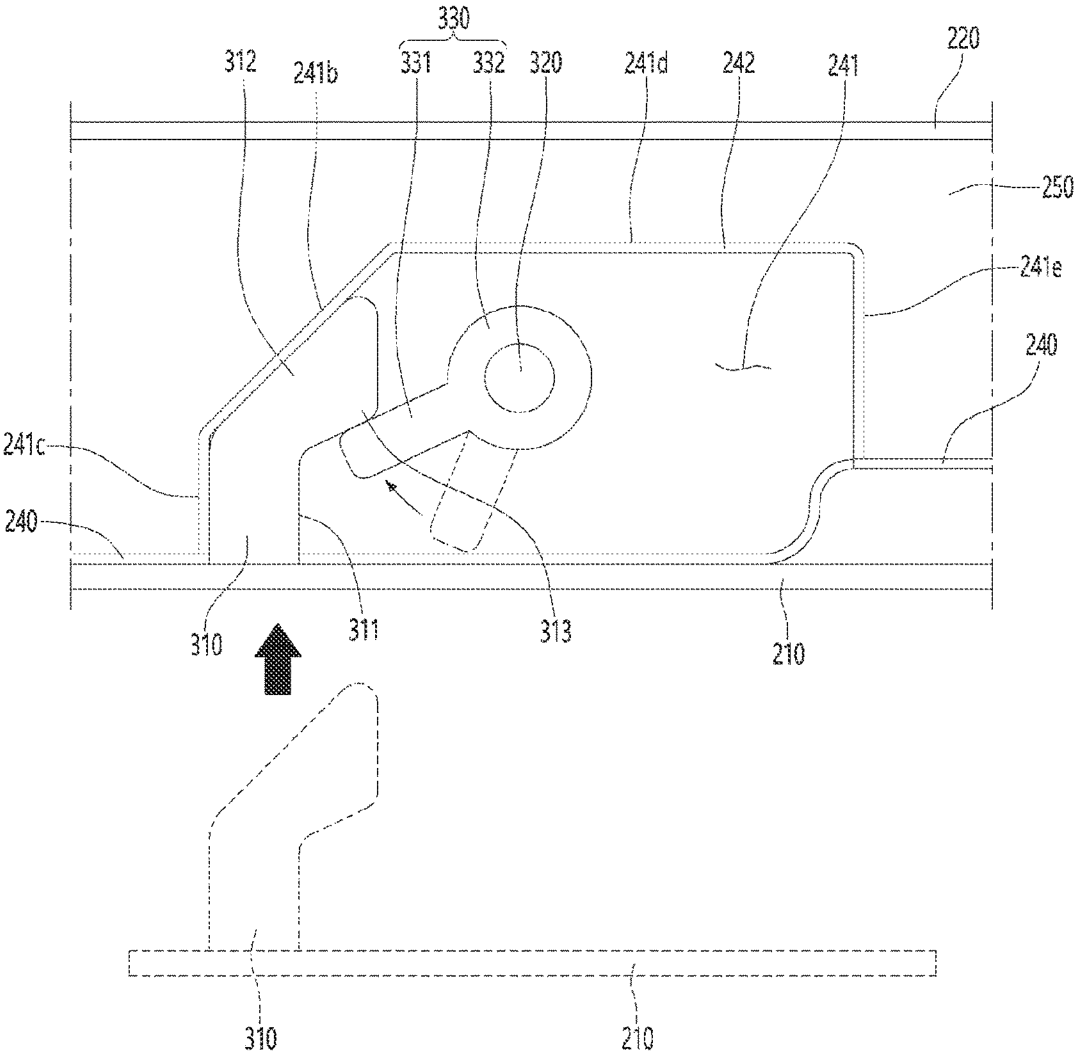
FIG. 8 is a cross-sectional view showing a state in which the coupling protrusion is locked by the fixing member in the locked state according to an embodiment of the present disclosure.
Figure 9:
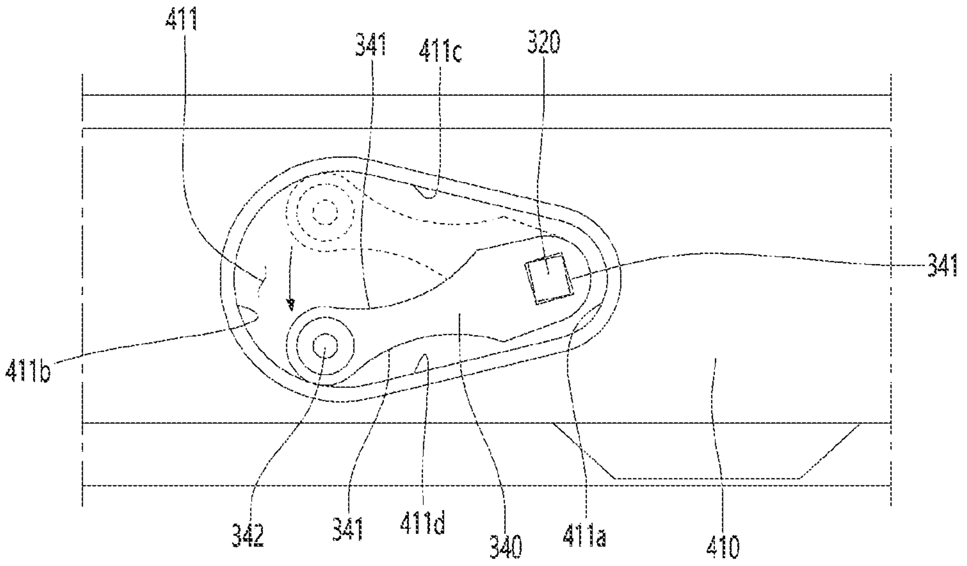
FIG. 9 is a view of the refrigerator door viewed from above in the unlocked state according to an embodiment of the present disclosure.
Figure 10:
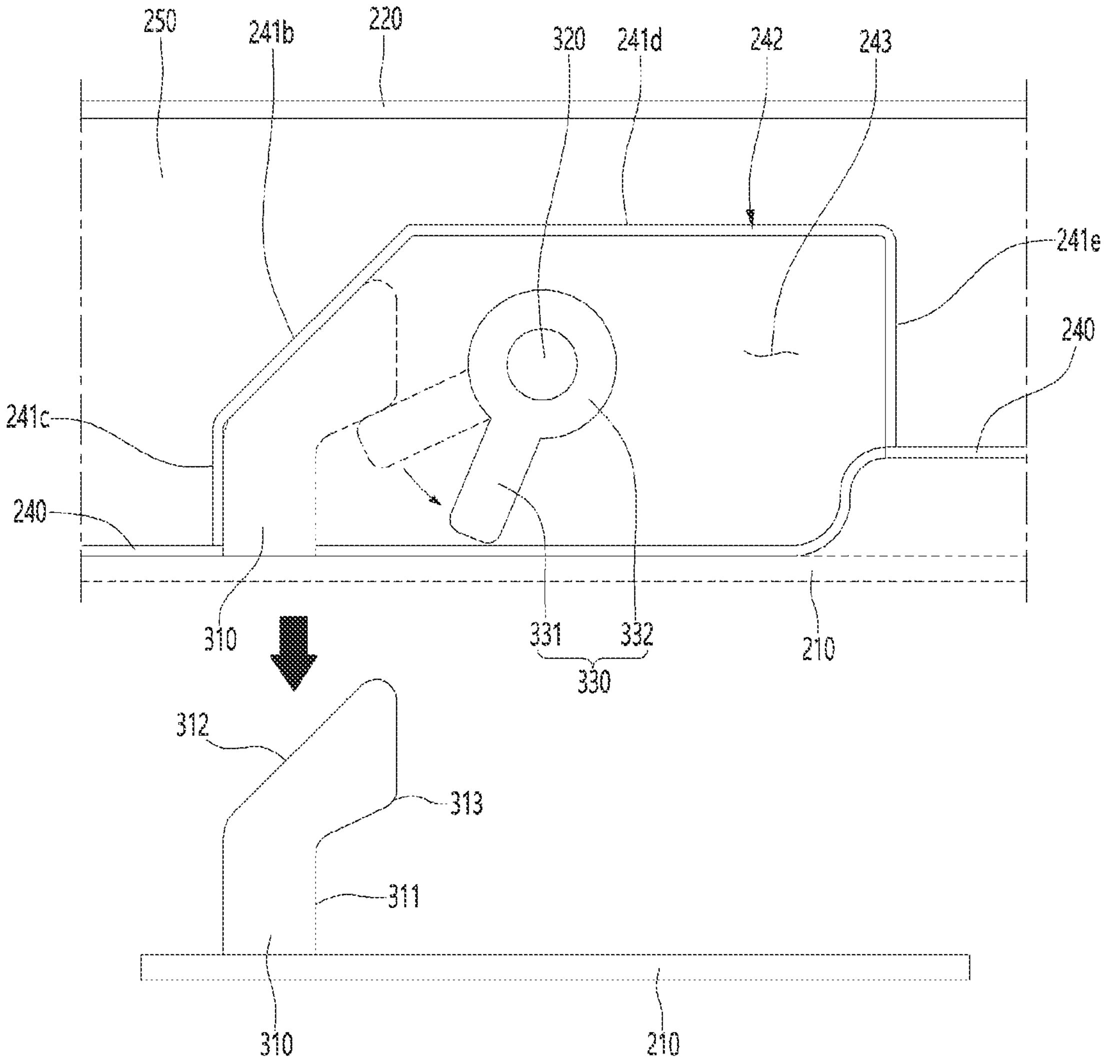
FIG. 10 is a cross-sectional view showing a state in which the coupling protrusion is released from the fixing member in the unlocked state according to an embodiment of the present disclosure.

FIG. 7 is a view of a refrigerator door viewed from above in a locked state according to an embodiment of the present disclosure. FIG. 8 is a cross-sectional view showing a state in which the coupling protrusion is locked by the fixing member in the locked state according to an embodiment of the present disclosure. FIG. 9 is a view of the refrigerator door viewed from above in the unlocked state according to an embodiment of the present disclosure. FIG. 10 is a cross-sectional view showing a state in which the coupling protrusion is released from the fixing member in the unlocked state according to an embodiment of the present disclosure.

Referring to FIGS. 7 to 10, the coupling protrusion 310 may include a first extension 311 extending rearward from the rear surface of the front panel 210, and a second extension 312 extending from the first extension 311 in the direction of the rotation shaft 320.

Here, the second extension 312 may extend in a direction crossing the first extension 311. The second extension 312 may extend toward the center side.

Also, the first extension 311 and the second extension 312 may form an obtuse angle.

Referring to FIGS. 8 and 10, the first extension 311 may be disposed on the left side of the rotation shaft 320. In addition, the second extension 312 may extend from the first extension 311 in the right direction. Further, the second extension 312 may extend to the right rear to face the rear.

In addition, the second extension 312 may be formed such that a thickness of the other end adjacent to the rotation shaft 320 is greater than that of one end connected to the first extension 311.

In addition, the second extension 312 may form a protrusion 313 protruding toward the fixing member 330 to be locked by the fixing member 330.

Referring to FIGS. 8 and 10, the first extension 311 may be disposed on the left side of the rotation shaft 320. In addition, the second extension 312 may extend to the right rear to face the rear. In addition, the protrusion 313 may protrude forward (downward in the drawing) from the right end of the second extension 312.

When the protrusion 313 is formed as described above, the coupling protrusion 310 may be locked or released by the fixing member 330 while the protrusion 313 is in contact with the fixing member 330.

Referring to FIGS. 7 and 9, a lever 340 for rotating the rotation shaft 320 may be coupled to the upper end of the rotation shaft 320.

The rotation shaft 320 may be coupled to one side (the right side of the drawing) of the lever 340.

The upper end of the rotation shaft 320 may be formed in a rectangular shape.

In addition, a rectangular hole 341 may be formed in one side of the lever 340 such that the upper end of the rotation shaft 320 is inserted thereinto.

Accordingly, when the lever 340 is rotated while the upper end of the rotation shaft 320 is inserted into the hole 341 of the lever 340, the rotation shaft 320 may rotate.

Gripping grooves 343 concave inwardly may be formed in both sides of the lever 340.

Referring to FIGS. 7 and 9, when the lever 340 is rotated from the front to the rear, the front panel 210 is switched to a locked state.

Here, the expression 'locked state' means a state in which the coupling protrusion 310 is fixed to maintain the state in which the coupling protrusion is inserted into the coupling groove 241.

On the other hand, referring to FIGS. 8 and 10, when the lever 340 is rotated from the rear to the front, the front panel 210 is switched to an unlocked state.

Here, the expression 'unlocked state' means a state in which fixing is released so that the coupling protrusion 310 may be separated from the coupling groove 241.

In addition, the lever 340 may be fastened to the upper end of the upper cap deco 410 through a separate fastening member 500 (refer to FIG. 6) in a state of being rotated forward or rearward.

A fastening hole 342 for fastening the fastening member 500 may be formed in the lever 340.

In addition, the lever 340 may be locked and fixed through a separate restraining part (not shown) in a state of being rotated forward or rearward.

In addition, the rotation shaft 320 passes through the upper cap deco 410 forming the upper surface of the refrigerator door 20, and the upper end of the rotation shaft 320 and the lever 340 are exposed to the outside of the upper cap deco 410.

In addition, a lever groove 411 concave downward is formed in the upper cap deco 410, and the lever 340 may be rotated while being accommodated in the lever groove 411.

Referring to FIGS. 7 and 9, the lever groove 411 forms a first curved portion 411*a* having a first radius on one side, and a second curved portion 411*b* having a second radius greater than the first radius on the other side. In addition, side portions 411*c* and 411*d* connecting the first curved portion 411*a* and the second curved portion 411*b* may be formed.

In this case, the rotation shaft 320 may be disposed on the side of the first curved portion 411*a*.

In addition, the lever 340 may be rotated forward or rearward by the fan-shaped lever groove 411 as described above.

Referring to FIGS. 4 and 6, the reinforcing panel 240 has an opening 241*a* open in a front-and-rear direction, a groove member 242 in which an inner groove 242*a* is formed to be concaved rearward is coupled to the rear surface of the reinforcing panel 240, and the coupling groove 241 may be defined by the opening 241*a* and the inner groove 242*a* of the groove member 242.

In addition, at least a portion of the inner surface of the coupling groove 241 may be formed as a curved surface or an inclined surface 241*b*.

For example, the coupling groove 241 includes a first sidewall 241*c* extending rearward, an inclined surface 241*b* extending to form an obtuse angle with the first sidewall 241*c*, a second sidewall 241*d* extending from the inclined surface 241*b* in a horizontal direction and a third sidewall 241*e* extending forward from the second sidewall 241*d*.

Referring to FIGS. 4 and 5, the reinforcing panel 240 may have irregularities formed in the horizontal direction, and at least a portion of the front surface facing the front panel may be formed as a flat surface.

The reinforcing panel 240 may have a reinforcing groove 246 formed to be concave rearward. The reinforcing groove 246 may extend in the vertical direction. A plurality of the reinforcement grooves 246 may be formed to be spaced apart in the horizontal direction.

A flat portion 245 may be formed between the reinforcing grooves 246.

For example, the front surface of the reinforcing panel 240 may contact the rear surface of the front panel 210. In this case, the flat portion 245 formed on the front surface of the reinforcing panel 240 may be in surface contact with the rear surface of the front panel 210.

In addition, a flat portion 245 may be formed at the upper end and lower end of the reinforcing panel 240 and the left end and right end of the reinforcing panel 240.

In addition, a magnet (not shown) may be attached to at least a portion of the reinforcing panel 240 to improve bending.

For example, a magnet (not shown) may be attached to at least a portion of the flat portion 245 to improve bending of the reinforcing panel 240.

Also, a magnet (not shown) may be attached to at least a portion of the front panel 210 to improve bending.

In addition, a heat insulating layer 250 (refer to FIG. 8) may be formed between the front panel 210 and the rear panel 220.

For example, the heat insulating layer 250 (refer to FIG. 8) may be formed by foaming urethane between the front panel 210 and the rear panel 220.

As another example, the heat insulating layer 250 (refer to FIG. 8) may be formed by foaming urethane between the reinforcing panel 240 and the rear panel 220.

In addition, a heat insulating pad (not shown) made of a heat insulating material may be additionally disposed at the center or the periphery between the front panel 210 and the rear panel 220.

In addition, a heat insulating pad (not shown) made of a heat insulating material may be additionally disposed at the center or the periphery between the reinforcing panel 240 and the rear panel 220 or between the reinforcing panel 240 and the front panel 210.

Hereinafter, a process of assembling the refrigerator door configured as described above and a process of detaching the front panel will be briefly described with reference to FIGS. 4 and 7 to 10.

First, the frame assembly 100 is disposed on both sides.

Thereafter, the upper cap deco 410 and the lower cap deco 420 are connected to the upper and lower sides of the frame assembly 100, respectively, to manufacture a 'ㅁ'-shaped frame in which the top, bottom, left and right are blocked.

Thereafter, the rear panel 220 and the reinforcing panel 240 are connected to the 'ㅁ'-shaped frame.

Here, the front and rear surfaces are blocked by the rear panel 220 and the reinforcing panel 240, both ends are blocked by the frame assembly 10, and the upper and lower portions are blocked by the cap deco 300 and the lower frame 400.

Thereafter, a foaming liquid is injected between the rear panel 220 and the reinforcing panel 240 to form the heat insulating layer 250.

Then, the front panel 210 is attached on the outside of the reinforcing panel 240.

At this time, the coupling groove 241 is formed in the reinforcing panel 240, and the coupling protrusion 310 is formed on the rear surface of the front panel 210. In addition, the lever 340 is rotated forward, and a fixing plate 331 of the fixing member 330 is rotated forward as shown in FIG. 10.

In this state, the user inserts the coupling protrusion 310 into the coupling groove 241 while pushing the front panel 210 from the front to the rear. Specifically, the coupling protrusion 310 is inserted into a space between the fixing plate 331 and the first sidewall 241*c*, Then, the lever 340 is rotated rearward.

When the lever 340 is rotated rearward as described above, the fixing plate 331 of the fixing member 330 is rotated rearward as shown in FIG. 8, and the fixing plate 331 brings the second extension 312 of the protrusion 310 into close contact with the inclined surface 241*b* while pushing the coupling protrusion 310 rearward.

For reference, the second extension 312 and the inclined surface 241*b* are formed side by side, and the fixing plate 331 pushes the coupling protrusion 310 rearward, such that the second extension 312 and the inclined surface 241*b* may be in surface contact with each other.

In this state, the lever 340 is fastened to the upper cap deco 410 by using a fastening part such as a screw to maintain the state in which the lever 340 is rotated rearward.

In addition, forward rotation of the lever 340 and the rotation shaft 320 is constrained, the fixing plate 331 continuously pushes the coupling protrusion 310 rearward, and, as a result, the front panel 210 is maintained in state of being fixed to the reinforcement panel 240.

At this time, a sealing member (not shown) made of a cushion material or an elastic material may be attached to at least a portion of the inner surface of the coupling groove 241.

The sealing member (not shown) may be inserted between the second extension 312 and the inclined surface 241*b* to hold a gap between the second extension 312 and the inclined surface 241*b*, and to improve adhesion.

In this state, when the front panel 210 is separated for reasons such as replacement, the lever 340 is released from the upper cap deco 410.

In addition, when the lever 340 is rotated forward as shown in FIG. 9, the rotation shaft 320 rotates, and the fixing member 330 also rotates forward as shown in FIG. 10.

Then, the fixing force for the coupling protrusion 310 is released.

In addition, when the user pulls the front panel 210 from the rear to the front, the coupling protrusion 310 comes out of the coupling groove 241, and the front panel 210 may be separated from the reinforcement panel 240.

Second Embodiment

Hereinafter, a refrigerator door according to another embodiment of the present disclosure will be described.

Figure 11:
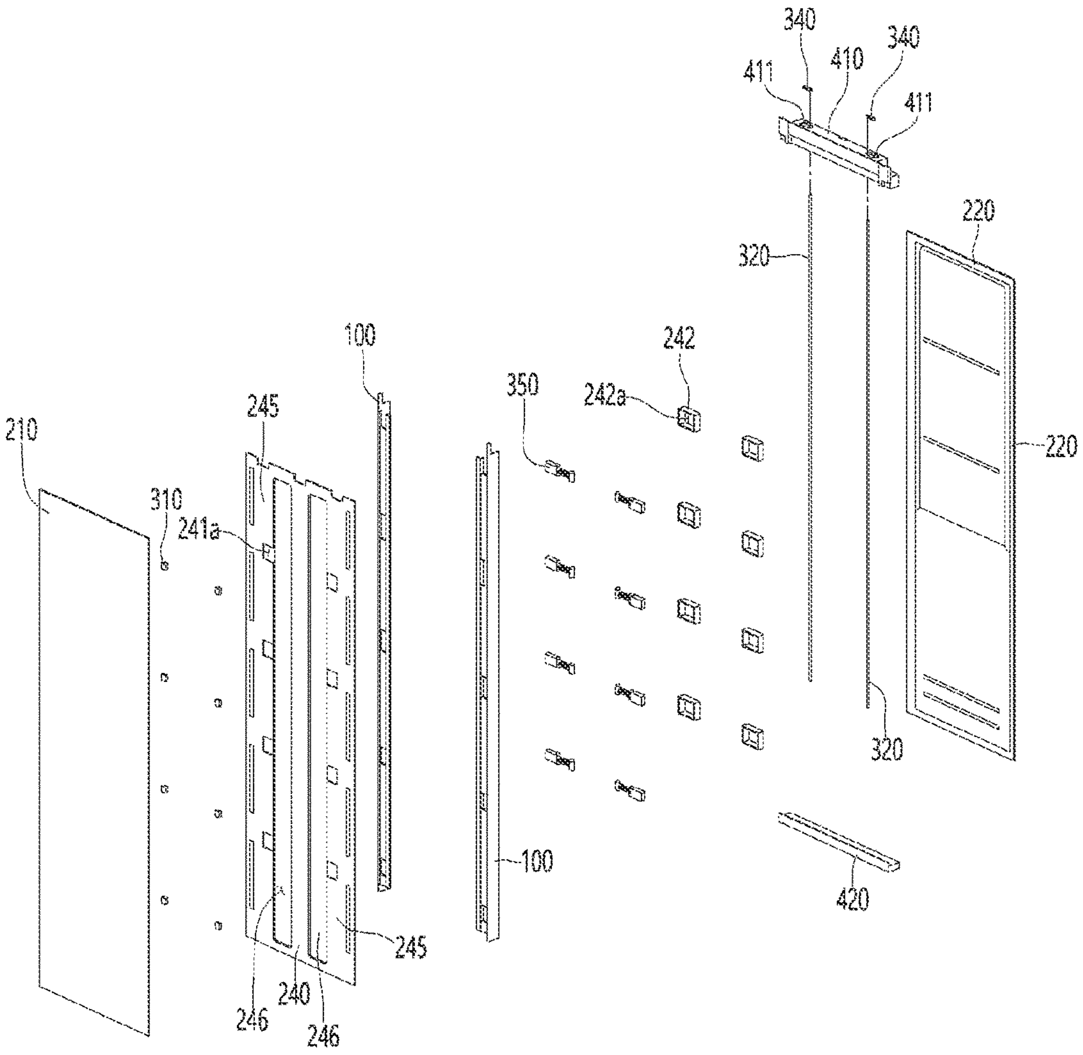
FIG. 11 is an exploded perspective view of a refrigerator door according to another embodiment of the present disclosure.

FIG. 11 is an exploded perspective view of a refrigerator door according to another embodiment of the present disclosure.

Referring to FIGS. 3 and 11, the refrigerator door 20 may include a frame assembly 100 forming appearance and a panel assembly 200 detachably coupled to the frame assembly 100.

The panel assembly 200 may form part or all of the appearance of the front surface of the refrigerator door 20. The appearance of the front surface of the refrigerator door 20 may substantially form the appearance of the front surface of the refrigerator 10.

Accordingly, the user may see the front surface of the panel assembly 200 in front of the refrigerator 10. The front surface of the panel assembly 200 may serve as a decorative panel at a place where the refrigerator 10 is installed. In this embodiment, the panel assembly 200 may be replaced according to user's preference. That is, according to the present disclosure, the user may easily separate the front surface of the panel assembly 200 and replace it with a design suitable for their preference.

Hereinafter, the refrigerator door 20 capable of not only easily replacing the panel assembly 200 in the refrigerator disposed alone but also replacing the panel assembly 200 without space limitation when the refrigerator 10 is accommodated in the furniture cabinet 1 will be described.

Referring to FIG. 11, the refrigerator door 20 according to an embodiment of the present disclosure includes a panel assembly 200 including a front panel 210 forming a front surface of the refrigerator door 20 and a rear panel 220 forming a rear surface of the refrigerator door 20 and a reinforcing panel 240 disposed between the front panel 210 and the rear panel 220.

In addition, the frame assembly 100 disposed side by side on both sides of the refrigerator door 20, including at least one frame, may be included.

According to the present disclosure, a coupling protrusion 310 may be formed on the rear surface of the front panel 210. Here, the coupling protrusion 310 may be formed to be fitted into a coupling groove 241 of the reinforcing panel 240.

Also, an upper cap deco 410 and a lower cap deco 420 that form the upper and lower surfaces of the refrigerator door 20 and are coupled to the frame assembly 100 and the panel assembly 200 may be included.

According to the present embodiment, the front panel 210 may be detachably coupled to the reinforcing panel 240 or the frame assembly 100.

To this end, the frame assembly 100 or the reinforcing panel 240 has the coupling grooves 241 formed to be concave rearward on one side facing the front panel 210, but the coupling grooves 241 are formed on both sides, and may be disposed to be spaced apart in the vertical direction.

In addition, on the rear surface of the front panel 210, the coupling protrusion 310, at least a portion of which is fixed while being accommodated in the coupling groove 241, may be formed.

For example, the coupling protrusion 310 may be integrally formed with the front panel 210.

As another example, the coupling protrusion 310 may be formed as a member separate from the front panel 210, and may be fixed to the rear surface of the front panel 210.

In this case, the coupling protrusion 310 may be fixed to the rear surface of the front panel 210 in various ways.

For example, it may be fixed to the rear surface of the front panel by a hot-melt method or an adhesive method.

The front panel 210 may be formed of a metal material including a steel material, a glass material, or a plastic material. In addition, the front panel 210 may be formed of a wood material.

In the following description, the case in which the coupling protrusion 310 is attached to the rear surface of the front panel 210 and the coupling groove 241 is formed in the reinforcing panel 240 is described as an example, but the scope of the present disclosure is limited thereto and the coupling protrusion 310 may be integrally formed on the rear surface of the front panel 210 or the coupling groove may be formed in the frame assembly 100.

In addition, the coupling grooves 241 may be disposed on both sides of the reinforcing panel 240. In addition, a plurality of the coupling grooves 241 may be formed, and may be disposed in a line to be spaced apart in the vertical direction.

In this case, coupling protrusions 310 may be formed on the rear surface of the front panel 210 to correspond to the coupling grooves 241. The coupling protrusions 310 may be formed on both sides of the rear surface of the front panel 210. In addition, a plurality of the coupling protrusions 310 may be formed and disposed in a line spaced apart in the vertical direction.

In addition, rotation shafts 320 to be described later may also be disposed on both sides to correspond to the coupling grooves 241, and fixing members 330 may be disposed in the coupling grooves 241.

In addition, levers 340 may also be disposed on both upper ends of the upper cap deco 410.

For example, the coupling grooves 241 may be symmetrically disposed on both sides with respect to the vertical center line of the reinforcing panel 240.

In addition, the rotation shafts 320, the fixing members 330, and the levers 340 may also be symmetrically disposed on both sides with respect to the vertical center line of the reinforcing panel 240.

In addition, the coupling protrusions 310 may also be symmetrically disposed on both sides with respect to the vertical center line of the front panel 210.

According to the present embodiment, various fixing parts for fixing the coupling protrusions 310 so as to maintain a state in which the coupling protrusions 310 are accommodated in the coupling grooves 241 may be further included.

Figure 12:
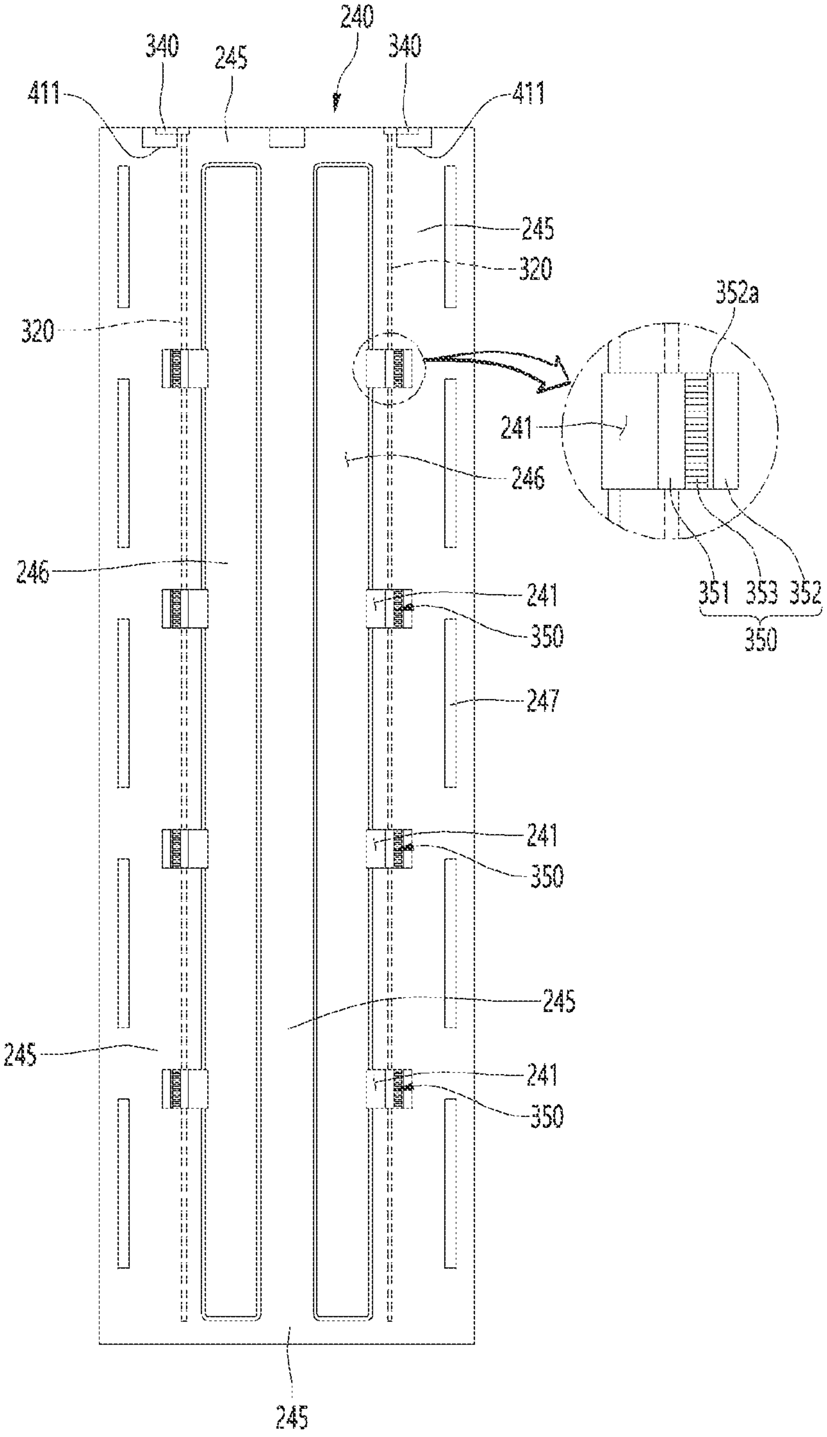
FIG. 12 is a front view of the refrigerator door, from which the front panel is separated, according to another embodiment of the present disclosure.
Figure 13:
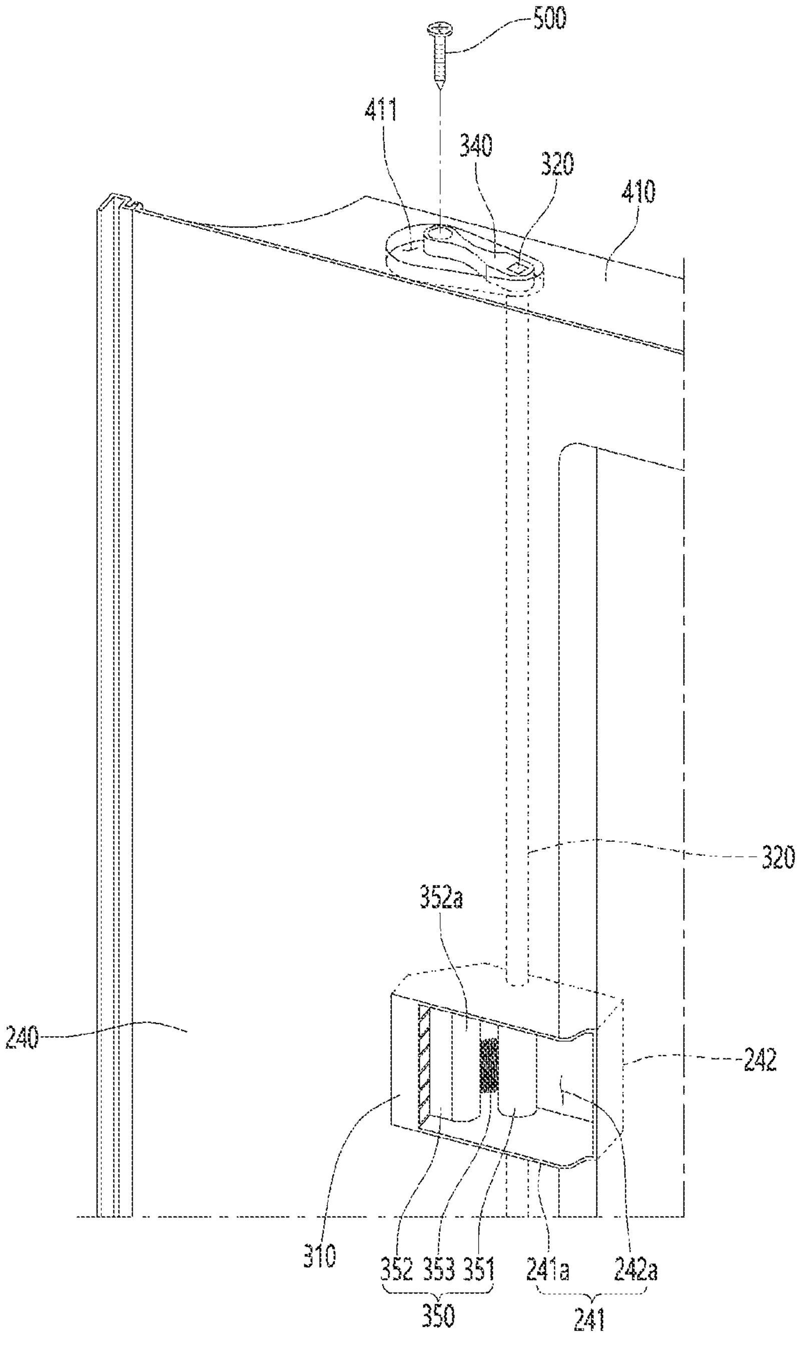
FIG. 13 is a perspective view of the refrigerator door, from which the front panel is separated, according to another embodiment of the present disclosure when viewed from above.

FIG. 12 is a front view of the refrigerator door, from which the front panel is separated, according to another embodiment of the present disclosure. FIG. 13 is a perspective view of the refrigerator door, from which the front panel is separated, according to another embodiment of the present disclosure when viewed from above.

Referring to FIGS. 12 to 13, between the reinforcing panel 240 and the rear panel 220, rotation shafts 320 extending in the vertical direction may be disposed on both sides to penetrate the coupling grooves 241.

In addition, the rotation shaft 320 is connected with fixing members 350 accommodated inside the coupling grooves 241 to fix or release the coupling protrusions 310 while rotating forward or rearward according to the rotational direction with the rotation shaft 320.

Here, the expression 'fixing' means an operation of fixing the coupling protrusions 310 to maintain a state in which the coupling protrusions 310 are inserted into the coupling grooves 241. In addition, the expression 'releasing' means an operation of releasing the fixing so that the coupling protrusions 310 may be separated from the coupling grooves 241.

Figure 14:
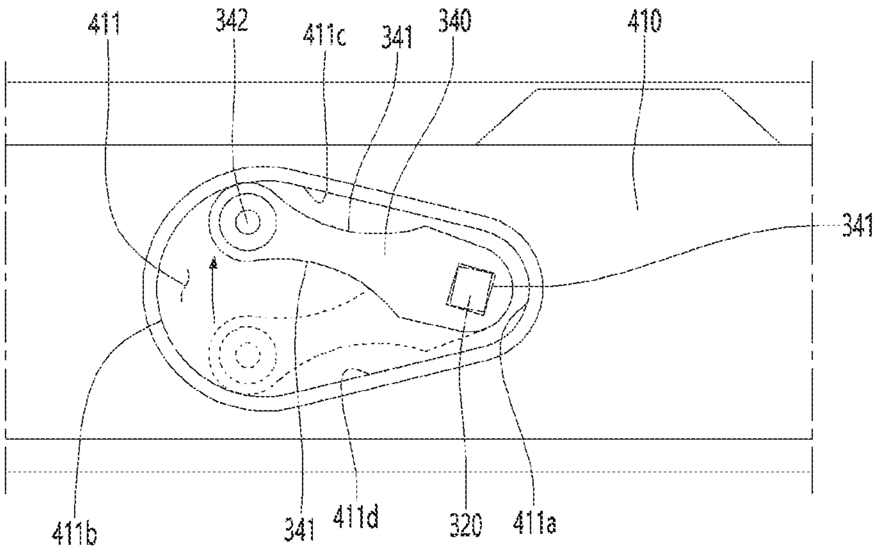
FIG. 14 is a view of a refrigerator door viewed from above in a locked state according to another embodiment of the present disclosure.
Figure 15:
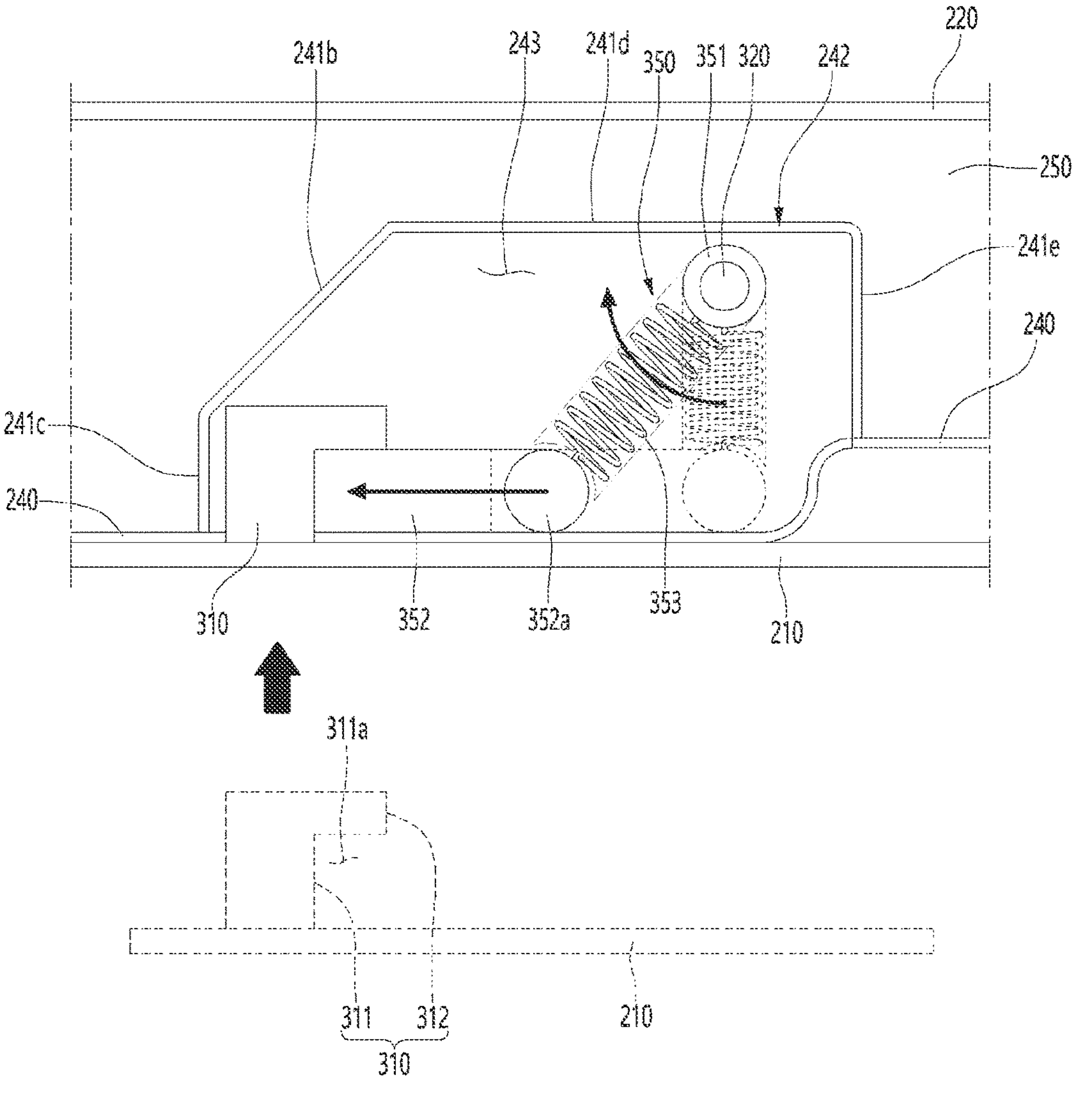
FIG. 15 is a cross-sectional view showing a state in which the coupling protrusion is locked by the fixing member in the locked state according to another embodiment of the present disclosure.
Figure 16:
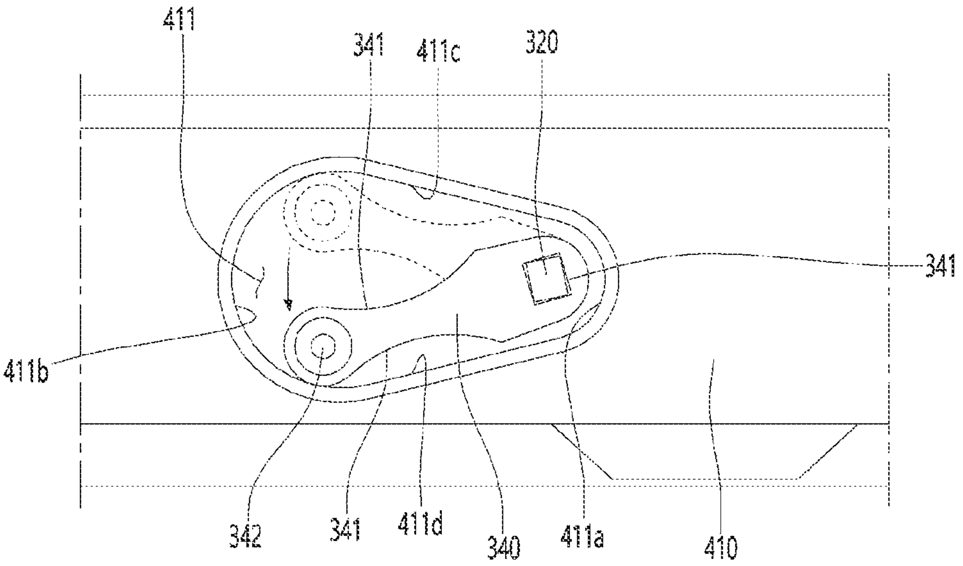
FIG. 16 is a view of the refrigerator door viewed from above in the unlocked state according to another embodiment of the present disclosure.
Figure 17:
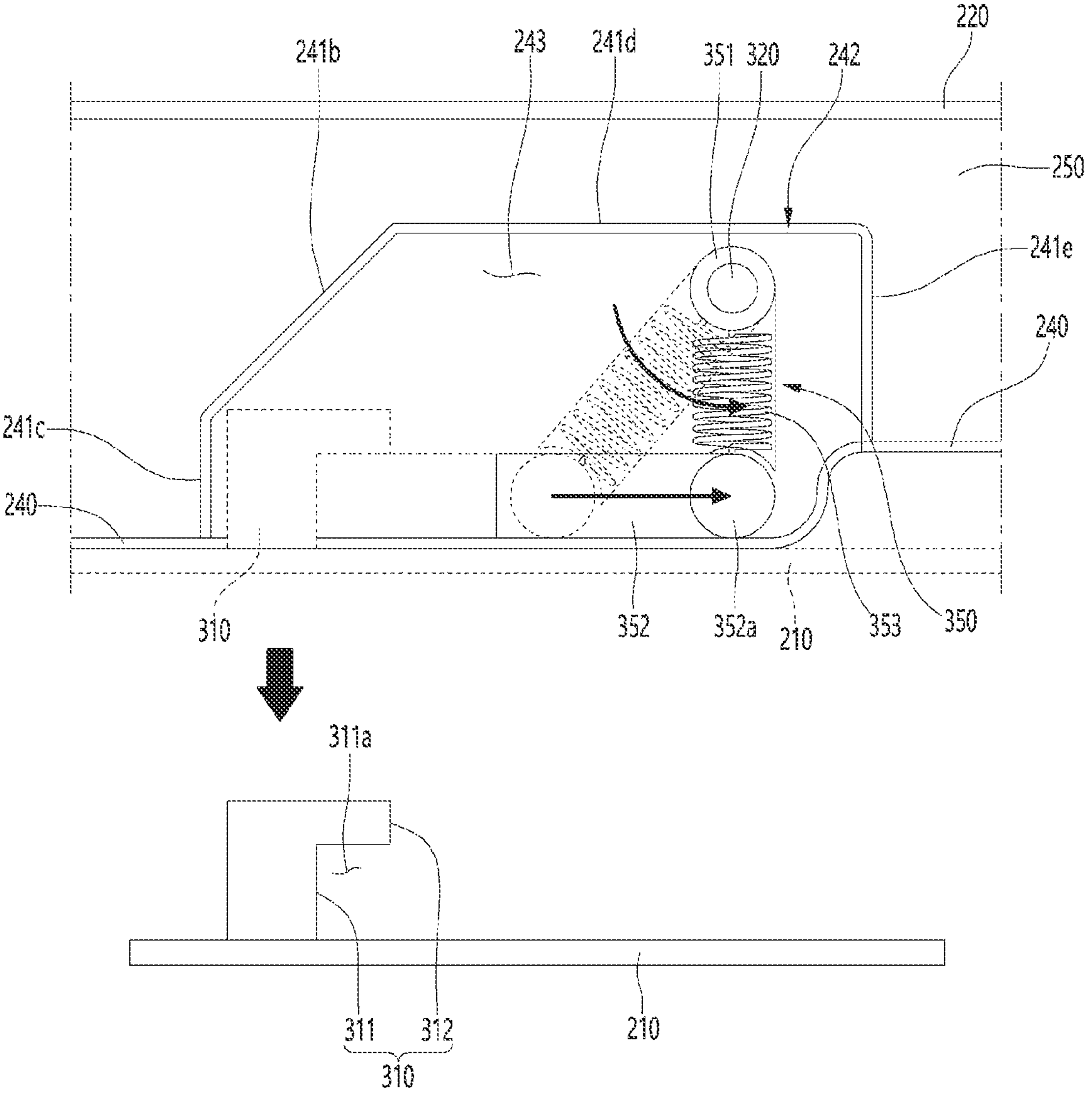
FIG. 17 is a cross-sectional view showing a state in which the coupling protrusion is released from the fixing member in the unlocked state according to another embodiment of the present disclosure.

FIG. 14 is a view of a refrigerator door viewed from above in a locked state according to another embodiment of the present disclosure. FIG. 15 is a cross-sectional view showing a state in which the coupling protrusion is locked by the fixing member in the locked state according to another embodiment of the present disclosure. FIG. 16 is a view of the refrigerator door viewed from above in the unlocked state according to another embodiment of the present disclosure. FIG. 17 is a cross-sectional view showing a state in which the coupling protrusion is released from the fixing member in the unlocked state according to another embodiment of the present disclosure.

Referring to FIGS. 14 to 17, the coupling protrusion 310 may include a first extension 311 extending rearward from the rear surface of the front panel 210, and a second extension 312 extending inward from the first extension 311 in the horizontal direction.

Here, the second extension 312 may extend in a direction crossing the first extension 311. The second extension 312 may extend toward the center side.

Also, the first extension 311 and the second extension 312 may form a right angle.

The coupling protrusions 310 are formed on both sides of the rear surface of the front panel 210.

At this time, the second extension 312 of the coupling protrusions 310 disposed on both sides may extend in a direction close to each other.

In addition, the coupling protrusion 310 may form a coupling groove 311*a* formed to be concave from the inside to the outside in a horizontal direction.

The coupling groove 311*a* may be defined by the rear surface of the front panel 210 and the first extension 311 and the second extension 312.

The coupling protrusions 310 are formed on both sides of the rear surface of the front panel 210.

In this case, the coupling grooves 311*a* of the coupling protrusions 310 disposed on both sides may be formed to be concave in a direction away from each other.

In addition, the coupling grooves 311*a* form an open entrance through which the fixing member 350 is drawn in or drawn out.

In this case, the coupling grooves 311*a* of the coupling protrusions 310 disposed on both sides may be formed in a direction in which the entrances face each other.

Referring to FIGS. 14 to 17 again, the fixing member 350 may include a shaft connector 351 coupled to the outer peripheral surface of the rotation shaft 320 to rotate together with the rotation shaft 320, a slider 352 selectively drawn in or out of the coupling groove 311*a* by the rotational operation of the shaft connector 351 while sliding in the horizontal direction, and an elastic member 353 connecting the shaft connector 351 and the slider 352 and moving the slider 352 in a straight line when the shaft connector 351 rotates.

One side of the elastic member 353 is connected to the shaft connector 351, and may rotate together with the shaft connector 351 when the rotation shaft 320 rotates. In addition, the other side of the elastic member 353 may be rotatably connected to the slider 352. The other side of the elastic member 353 and the slider 352 may be connected through a separate hinge 352*a* that rotates.

In addition, the elastic member 353 may include a coil spring. As another example, the telescoping member 353 may include a multi-stage stretchable tube. As another example, the elastic member 353 may be formed of various materials and structures having stretch or elasticity.

In addition, when the shaft connector 351 rotates, the elastic member 353 rotates together with the shaft connector 351 and expands and contracts at the same time, and, as a result, various embodiments may occur in a range in which the slider 352 may move in a straight line in the horizontal direction (the left-and-right direction of FIG. 15).

In addition, the length of the elastic member 353 becomes longer when the slider 352 is inserted into the coupling groove 311*a*, and becomes shorter when the slider 352 is separated from the coupling groove 311*a*.

Accordingly, when the shaft connector 351 coupled to the rotation shaft 320 rotates clockwise in a state of being vertically erected with respect to the rear surface of the front panel 210 as shown in FIG. 15, the elastic member 353 is elongated. Accordingly, while the slider 352 slides to the left, the slider 352 may be inserted into the coupling groove 311*a*, and the front panel 210 may be fixed.

On the other hand, as shown in FIG. 17, when the shaft connector 351 coupled to the rotation shaft 320 rotates counterclockwise, the elastic member 353 is compressed and shortened. Accordingly, while the slider 352 slides to the right, the slider 352 may be separated from the coupling groove 311*a*, and the front panel 210 may be switched to a detachable state.

For reference, one side of the elastic member 353 is fixed to the rotation shaft 320 and the shaft connector 351. In addition, when the shaft connector 351 coupled to the rotation shaft 320 rotates counterclockwise, the other side of the elastic member 353 is compressed by the rear surface of the front panel 210 and the length thereof may be shortened.

Referring to FIGS. 15 and 17 again, the first extension 311 may be disposed on the left side of the rotation shaft 320. In addition, the second extension 312 may extend in the right direction from the first extension 311. In addition, the coupling groove 311*a* may be concavely formed from right to left. In addition, the slider 352 may be inserted into the coupling groove 311*a* or separated from the coupling groove 311*a* while moving in the left-and-right direction.

Referring to FIGS. 14 and 16, a lever 340 for rotating the rotation shaft 320 may be coupled to the upper end of the rotation shaft 320.

The rotation shaft 320 may be coupled to one side (the right side of the drawing) of the lever 340.

The upper end of the rotation shaft 320 may be formed in a rectangular shape.

In addition, a rectangular hole 341 may be formed in one side of the lever 340 such that the upper end of the rotation shaft 320 is inserted thereinto.

Accordingly, when the lever 340 is rotated while the upper end of the rotation shaft 320 is inserted into the hole 341 of the lever 340, the rotation shaft 320 may rotate.

Gripping grooves 343 concave inwardly may be formed in both sides of the lever 340.

Referring to FIGS. 14 and 16, when the lever 340 is rotated from the front to the rear, the front panel 210 is switched to a locked state.

Here, the expression 'locked state' means a state in which the coupling protrusion 310 is fixed to maintain the state in which the coupling protrusion is inserted into the coupling groove 241.

On the other hand, referring to FIGS. 15 and 17, when the lever 340 is rotated from the rear to the front, the front panel 210 is switched to an unlocked state.

Here, the expression 'unlocked state' means a state in which fixing is released so that the coupling protrusion 310 may be separated from the coupling groove 241.

In addition, the lever 340 may be fastened to the upper end of the upper cap deco 410 through a separate fastening member 500 (refer to FIG. 13) in a state of being rotated forward or rearward.

A fastening hole 342 for fastening the fastening member 500 may be formed in the lever 340.

In addition, the lever 340 may be locked and fixed through a separate restraining part (not shown) in a state of being rotated forward or rearward.

In addition, the rotation shaft 320 passes through the upper cap deco 410 forming the upper surface of the refrigerator door 20, and the upper end of the rotation shaft 320 and the lever 340 are exposed to the outside of the upper cap deco 410.

In addition, a lever groove 411 concave downward is formed in the upper cap deco 410, and the lever 340 may be rotated while being accommodated in the lever groove 411.

Referring to FIGS. 14 and 16, the lever groove 411 forms a first curved portion 411*a* having a first radius on one side, and a second curved portion 411*b* having a second radius greater than the first radius on the other side. In addition, side portions 411*c* and 411*d* connecting the first curved portion 411*a* and the second curved portion 411*b* may be formed.

In this case, the rotation shaft 320 may be disposed on the side of the first curved portion 411*a*.

In addition, the lever 340 may be rotated forward or rearward by the fan-shaped lever groove 411 as described above.

Referring to FIGS. 11 and 13, the reinforcing panel 240 has an opening 241*a* open in a front-and-rear direction, a groove member 242 in which an inner groove 242*a* is formed to be concaved rearward is coupled to the rear surface of the reinforcing panel 240, and the coupling groove 241 may be defined by the opening 241*a* and the inner groove 242*a* of the groove member 242.

In addition, at least a portion of the inner surface of the coupling groove 241 may be formed as a curved surface or an inclined surface 241*b*.

For example, the coupling groove 241 includes a first sidewall 241*c* extending rearward, an inclined surface 241*b* extending to form an obtuse angle with the first sidewall 241*c*, a second sidewall 241*d* extending from the inclined surface 241*b* in a horizontal direction and a third sidewall 241*e* extending forward from the second sidewall 241*d*.

Referring to FIGS. 11 and 12, the reinforcing panel 240 may have irregularities formed in the horizontal direction, and at least a portion of the front surface facing the front panel may be formed as a flat surface.

The reinforcing panel 240 may have a reinforcing groove 246 formed to be concave rearward. The reinforcing groove 246 may extend in the vertical direction. A plurality of the reinforcement grooves 246 may be formed to be spaced apart in the horizontal direction.

A flat portion 245 may be formed between the reinforcing grooves 246.

For example, the front surface of the reinforcing panel 240 may contact the rear surface of the front panel 210. In this case, the flat portion 245 formed on the front surface of the reinforcing panel 240 may be in surface contact with the rear surface of the front panel 210.

In addition, a flat portion 245 may be formed at the upper end and lower end of the reinforcing panel 240 and the left end and right end of the reinforcing panel 240.

In addition, a magnet (not shown) may be attached to at least a portion of the reinforcing panel 240 to improve bending.

For example, a magnet (not shown) may be attached to at least a portion of the flat portion 245 to improve bending of the reinforcing panel 240.

Also, a magnet (not shown) may be attached to at least a portion of the front panel 210 to improve bending.

In addition, a heat insulating layer 250 (refer to FIG. 15) may be formed between the front panel 210 and the rear panel 220.

For example, the heat insulating layer 250 (refer to FIG. 15) may be formed by foaming urethane between the front panel 210 and the rear panel 220.

As another example, the heat insulating layer 250 (refer to FIG. 18) may be formed by foaming urethane between the reinforcing panel 240 and the rear panel 220.

In addition, a heat insulating pad (not shown) made of a heat insulating material may be additionally disposed at the center or the periphery between the front panel 210 and the rear panel 220.

In addition, a heat insulating pad (not shown) made of a heat insulating material may be additionally disposed at the center or the periphery between the reinforcing panel 240 and the rear panel 220 or between the reinforcing panel 240 and the front panel 210.

Hereinafter, a process of assembling the refrigerator door configured as described above and a process of detaching the front panel will be briefly described with reference to FIGS. 11 and 14 to 17.

First, the frame assembly 100 is disposed on both sides.

Thereafter, the upper cap deco 410 and the lower cap deco 420 are connected to the upper and lower sides of the frame assembly 100, respectively, to manufacture a 'ㅁ'-shaped frame in which the top, bottom, left and right are blocked.

Thereafter, the rear panel 220 and the reinforcing panel 240 are connected to the 'ㅁ'-shaped frame.

Here, the front and rear surfaces are blocked by the rear panel 220 and the reinforcing panel 240, both ends are blocked by the frame assembly 10, and the upper and lower portions are blocked by the cap deco 300 and the lower frame 400.

Thereafter, a foaming liquid is injected between the rear panel 220 and the reinforcing panel 240 to form the heat insulating layer 250.

Then, the front panel 210 is attached on the outside of the reinforcing panel 240.

At this time, the coupling groove 241 is formed in the reinforcing panel 240, and the coupling protrusion 310 is formed on the rear surface of the front panel 210. In addition, the lever 340 is rotated forward, and a fixing plate 331 of the fixing member 330 is rotated forward as shown in FIG. 17. In this case, the shaft connector 351 coupled to the rotation shaft 320 may be vertically erected with respect to the rear surface of the front panel 210.

In this state, the user inserts the coupling protrusion 310 into the coupling groove 241 while pushing the front panel 210 from the front to the rear. Specifically, the coupling protrusion 310 is inserted into a space between the fixing plate 331 and the first sidewall 241*c*, Then, the lever 340 is rotated rearward.

When the lever 340 is rotated rearward as described above, the shaft connector 351 coupled to the rotation shaft 320 is rotated clockwise as shown in FIG. 15, the elastic member 353 is stretched and the slider 352 is slid to the left. As described above, when the elastic member 353 is lengthened, the slider 352 slides to the left, one end of the slider 352 is inserted into the coupling groove 311*a*, and the front panel 210 may be fixed.

In this state, the lever 340 is fastened to the upper cap deco 410 by using a fastening part such as a screw to maintain the state in which the lever 340 is rotated rearward.

In addition, forward rotation of the lever 340 and the rotation shaft 320 is constrained, a state in which the slider 352 is inserted into the coupling groove 311*a* is maintained, and, as a result, a state in which the front panel 210 is fixed to the reinforcing panel 240 may be maintained.

At this time, a sealing member (not shown) made of a cushion material or an elastic material may be attached to at least a portion of the inner surface of the coupling groove 241.

In this state, when the front panel 210 is separated for reasons such as replacement, the lever 340 is released from the upper cap deco 410.

In addition, when the lever 340 is rotated forward as shown in FIG. 16, the rotation shaft 320 rotates, and the fixing member 350 also rotates forward as shown in FIG. 17. As described above, when the shaft connector 351 coupled to the rotation shaft 320 rotates forward, the elastic member 353 is compressed and shortened, and thus the slider 352 slides to the right. In addition, when the slider 352 is separated from the coupling groove 311*a*, the fixing force on the coupling protrusion 310 is released, and the front panel 210 may be switched to a detachable state.

In addition, when the user pulls the front panel 210 from the rear to the front, the coupling protrusion 310 comes out of the coupling groove 241, and the front panel 210 may be separated from the reinforcement panel 240.

The invention claimed is:

1. A refrigerator comprising:

a cabinet having a storage compartment; and a refrigerator door configured to open and close the cabinet, wherein the refrigerator door comprises:

a frame assembly that defines an edge of the refrigerator door and that extends in a longitudinal direction, a front panel that is coupled to the frame assembly and that defines a front surface of the refrigerator door, a rear panel that is coupled to the frame assembly and that defines a rear surface of the refrigerator door, and a reinforcing panel disposed between the front panel and the rear panel, wherein the reinforcing panel defines coupling grooves that face the front panel and that are spaced apart from one another in a vertical direction, wherein the front panel comprises coupling protrusions that protrude from a rear surface of the front panel and that are configured to be accommodated in the coupling grooves, and wherein the refrigerator door further comprises fixing members that are disposed in the coupling grooves and that are configured to move relative to the front panel to thereby fix or release the coupling protrusions.

2. The refrigerator of claim 1, further comprising:

rotation shafts that extend in the vertical direction and that are disposed between the reinforcing panel and the rear panel, the rotation shafts passing through the coupling grooves, wherein the fixing members are accommodated inside the coupling grooves and connected to the rotation shafts, the fixing members being configured to rotate forward or rearward according to a rotation direction of the rotation shaft to thereby fix or release the coupling protrusions.

3. The refrigerator of claim 2, wherein each of the coupling protrusions comprises:

a first extension extending rearward from the rear surface of the front panel; and a second extension extending from the first extension toward one of the rotation shafts.

4. The refrigerator of claim 3, wherein the first extension and the second extension define an obtuse angle.

5. The refrigerator of claim 3, wherein the second extension has (i) a first end connected to the first extension and (i) a second end spaced apart from the first end, and wherein a thickness of the second end of the second extension is greater than a thickness of the first end connected to the first extension.

6. The refrigerator of claim 3, wherein the second extension defines a protrusion that protrudes toward one of the fixing members and that is configured to be locked by the one of the fixing members.

7. The refrigerator of claim 2, wherein each of the coupling protrusions comprises:

a first extension extending rearward from the rear surface of the front panel; and a second extension extending from the first extension in a horizontal direction.

8. The refrigerator of claim 7, wherein the first extension and the second extension define a right angle.

9. The refrigerator of claim 7, wherein each of the coupling protrusions defines a coupling recess that is concave in the horizontal direction from an inside of the front panel to an outside of the front panel.

10. The refrigerator of claim 9, wherein each of the fixing members comprises:

a shaft connector coupled to one of the rotation shafts and configured to rotate together with the one of the rotation shafts; and a slider configured to move in the horizontal direction and configured to be selectively drawn in or drawn out of the coupling recess by rotation of the shaft connector.

11. The refrigerator of claim 10, wherein each of the fixing members further comprises an elastic member that connects the shaft connector and the slider and that is configured to move the slider along a straight line based on rotation of the shaft connector.

12. The refrigerator of claim 2, further comprising a lever that is configured to manipulate at least one of the rotation shafts and that is coupled to an upper end of the at least one of the rotation shafts.

13. The refrigerator of claim 12, wherein the lever is configured to, based on rotating rearward, switch the front panel to a locked state, and wherein the lever is configured to, based on rotating forward, switch the front panel to an unlocked state.

14. The refrigerator of claim 12, further comprising an upper cap deco and a fastening member that rotatably couples the lever to an upper end of the upper cap deco.

15. The refrigerator of claim 12, further comprising an upper cap deco that defines an upper surface of the refrigerator door, wherein the rotation shafts pass through the upper cap deco, and wherein upper ends of the rotation shafts and the lever are exposed to an outside of the upper cap deco.

16. The refrigerator of claim 15, wherein the upper cap deco defines a lever groove that is concave downward, and wherein the lever is accommodated in the lever groove.

17. The refrigerator of claim 1, wherein the reinforcing panel defines an opening that is open in a front-and-rear direction, wherein the refrigerator door further comprises a groove member that is concave rearward and that is coupled to a rear surface of the reinforcing panel, and wherein each of the coupling grooves is defined by an inner space of the groove member and the opening.

18. The refrigerator of claim 1, wherein at least a portion of an inner surface of each of the coupling grooves is a curved surface or an inclined surface.

19. The refrigerator of claim 1, wherein the reinforcing panel has irregularities in a horizontal direction, and wherein the reinforcing panel has a front surface facing the front panel, and at least a portion of the front surface of the reinforcing panel is flat.

20. The refrigerator of claim 1, further comprising a heat insulating layer that is made of a heat insulating material and that is disposed between the reinforcing panel and the rear panel.

* * * * *